US007815504B2

(12) United States Patent
Okada

(10) Patent No.: US 7,815,504 B2
(45) Date of Patent: Oct. 19, 2010

(54) SLOT MACHINE AND PLAYING METHOD THEREOF

(75) Inventor: Kazuo Okada, Tokyo (JP)

(73) Assignee: Aruze Gaming America, Inc., Las Vegas, NV (US)

( * ) Notice: Subject to any disclaimer, the term of this patent is extended or adjusted under 35 U.S.C. 154(b) by 854 days.

(21) Appl. No.: 11/638,455

(22) Filed: Dec. 14, 2006

(65) Prior Publication Data

US 2008/0058061 A1 Mar. 6, 2008

Related U.S. Application Data

(60) Provisional application No. 60/842,018, filed on Sep. 5, 2006.

(51) Int. Cl.
*G06F 17/00* (2006.01)

(52) U.S. Cl. ........................................................ 463/20

(58) Field of Classification Search .............. 463/16–25
See application file for complete search history.

(56) References Cited

U.S. PATENT DOCUMENTS

| | | | | |
|---|---|---|---|---|
| 6,093,102 | A | 7/2000 | Bennett | |
| 6,604,999 | B2 | 8/2003 | Ainsworth | |
| 7,252,590 | B2 * | 8/2007 | Palmer et al. | 463/16 |
| 7,291,067 | B2 * | 11/2007 | Tarantino | 463/22 |
| 7,607,978 | B2 * | 10/2009 | Palmer et al. | 463/16 |
| 2009/0239617 | A1 * | 9/2009 | Hosokawa | 463/20 |

* cited by examiner

*Primary Examiner*—Ronald Laneau
(74) *Attorney, Agent, or Firm*—NDQ&M Watchstone LLP

(57) ABSTRACT

When a start condition of a special game is established during a base game, payout amount of credits for occurrence of an award accompanied by payout of credits due to a specific symbol during a predetermined number of times of a special game is varied in accordance with the number of rearranged specific player-selected symbols at the start of the special game. Alternatively, payout amount of credits when the predetermined number of times of the special game terminate is varied in accordance with the number of times of occurrence of the award accompanied by payout of credits due to the specific symbol.

18 Claims, 44 Drawing Sheets

FIG. 3

| | 28a | 28b | 28c | 28d | 28e |
|---|---|---|---|---|---|
| CODE NO. | SYMBOL | SYMBOL | SYMBOL | SYMBOL | SYMBOL |
| 00 | JACKPOT 7 | JACKPOT 7 | JACKPOT 7 | JACKPOT 7 | JACKPOT 7 |
| 01 | PLUM | BELL | CHERRY | ORANGE | APPLE |
| 02 | ORANGE | APPLE | ORANGE | PLUM | ORANGE |
| 03 | PLUM | BELL | APPLE | STRAWBERRY | BELL |
| 04 | LOBSTER | CHERRY | ORANGE | BELL | PLUM |
| 05 | PLUM | LOBSTER | PLUM | PLUM | BLUE 7 |
| 06 | ORANGE | PLUM | LOBSTER | APPLE | ORANGE |
| 07 | PLUM | CHERRY | PLUM | BLUE 7 | APPLE |
| 08 | BLUE 7 | BELL | ORANGE | PLUM | PLUM |
| 09 | CHERRY | APPLE | PLUM | ORANGE | BELL |
| 10 | ORANGE | BELL | ORANGE | BELL | CHERRY |
| 11 | BELL | STRAWBERRY | PLUM | LOBSTER | PLUM |
| 12 | ORANGE | PLUM | BELL | PLUM | CRAB |
| 13 | STRAWBERRY | BLUE 7 | STRAWBERRY | CHERRY | ORANGE |
| 14 | BLUE 7 | BELL | BLUE 7 | APPLE | APPLE |
| 15 | ORANGE | APPLE | BELL | STRAWBERRY | PLUM |
| 16 | APPLE | BELL | CHERRY | CRAB | CHERRY |
| 17 | CRAB | STRAWBERRY | CRAB | BELL | LOBSTER |
| 18 | ORANGE | CRAB | ORANGE | PLUM | BELL |
| 19 | PLUM | CHERRY | PLUM | ORANGE | ORANGE |
| 20 | BLUE 7 | BELL | ORANGE | CHERRY | PLUM |
| 21 | CHERRY | APPLE | PLUM | PLUM | STRAWBERRY |

FIG. 4A

| 28a | 28b | 28c | 28d | 28e | PAYOUT |
|---|---|---|---|---|---|
| APPLE | APPLE | APPLE | APPLE | APPLE | BONUS GAME |
| BELL | BELL | BELL | BELL | BELL | 25 COINS |
| CHERRY | CHERRY | CHERRY | CHERRY | CHERRY | 20 COINS |
| PLUM | PLUM | PLUM | PLUM | PLUM | 5 COINS |
| ⋮ | ⋮ | ⋮ | ⋮ | ⋮ | ⋮ |
| SYMBOL COMBINATION OF 6 BELLS | | | | | 3 COINS |
| ⋮ | | | | | |

FIG. 4B

| 28a | 28b | 28c | 28d | 28e | PAYOUT |
|---|---|---|---|---|---|
| APPLE | APPLE | APPLE | APPLE | APPLE | BONUS GAME |
| BELL | BELL | BELL | BELL | BELL | 25 COINS |
| CHERRY | CHERRY | CHERRY | CHERRY | CHERRY | 20 COINS |
| PLUM | PLUM | PLUM | PLUM | PLUM | 5 COINS |
| ⋮ | ⋮ | ⋮ | ⋮ | ⋮ | ⋮ |
| SYMBOL COMBINATION OF 6 BELLS | | | | | 3 COINS |
| SYMBOL COMBINATION OF 6 (PLAYER-SELECTED SYMBOLS) | | | | | 3 COINS |
| SPECIAL GAME MINIMUM GUARANTEE | | | | | 2 COINS |
| ⋮ | | | | | |

FIG. 4C

| 28a | 28b | 28c | 28d | 28e | PAYOUT |
|---|---|---|---|---|---|
| APPLE | APPLE | APPLE | APPLE | APPLE | BONUS GAME |
| BELL | BELL | BELL | BELL | BELL | 25 COINS |
| CHERRY | CHERRY | CHERRY | CHERRY | CHERRY | 20 COINS |
| PLUM | PLUM | PLUM | PLUM | PLUM | 5 COINS |
| ⋮ | ⋮ | ⋮ | ⋮ | ⋮ | ⋮ |
| SYMBOL COMBINATION OF 6 BELLS | | | | | 3 COINS |
| SYMBOL COMBINATION OF 6 (PLAYER-SELECTED SYMBOLS) | | | | | 6 COINS |
| SPECIAL GAME MINIMUM GUARANTEE | | | | | 2 COINS |
| ⋮ | | | | | |

FIG. 4D

| 28a | 28b | 28c | 28d | 28e | PAYOUT |
|---|---|---|---|---|---|
| APPLE | APPLE | APPLE | APPLE | APPLE | BONUS GAME |
| BELL | BELL | BELL | BELL | BELL | 25 COINS |
| CHERRY | CHERRY | CHERRY | CHERRY | CHERRY | 20 COINS |
| PLUM | PLUM | PLUM | PLUM | PLUM | 5 COINS |
| ... | ... | ... | ... | ... | ... |
| SYMBOL COMBINATION OF 6 BELLS | | | | | 3 COINS |
| SYMBOL COMBINATION OF 6 (PLAYER-SELECTED SYMBOLS) | | | | | 12 COINS |
| SPECIAL GAME MINIMUM GUARANTEE | | | | | 2 COINS |
| ... | | | | | |

FIG. 4E

| 28a | 28b | 28c | 28d | 28e | PAYOUT |
|---|---|---|---|---|---|
| APPLE | APPLE | APPLE | APPLE | APPLE | BONUS GAME |
| BELL | BELL | BELL | BELL | BELL | 25 COINS |
| CHERRY | CHERRY | CHERRY | CHERRY | CHERRY | 20 COINS |
| PLUM | PLUM | PLUM | PLUM | PLUM | 5 COINS |
| ⋮ | ⋮ | ⋮ | ⋮ | ⋮ | ⋮ |
| SYMBOL COMBINATION OF 6 BELLS | | | | | 3 COINS |
| SYMBOL COMBINATION OF 6 (PLAYER-SELECTED SYMBOLS) | | | | | 24 COINS |
| SPECIAL GAME MINIMUM GUARANTEE | | | | | 2 COINS |
| ⋮ | | | | | |

FIG. 4F

| 28a | 28b | 28c | 28d | 28e | PAYOUT |
|---|---|---|---|---|---|
| APPLE | APPLE | APPLE | APPLE | APPLE | BONUS GAME |
| BELL | BELL | BELL | BELL | BELL | 25 COINS |
| CHERRY | CHERRY | CHERRY | CHERRY | CHERRY | 20 COINS |
| PLUM | PLUM | PLUM | PLUM | PLUM | 5 COINS |
| ⋮ | ⋮ | ⋮ | ⋮ | ⋮ | ⋮ |
| SYMBOL COMBINATION OF 6 BELLS | | | | | 3 COINS |
| SYMBOL COMBINATION OF 6 (PLAYER-SELECTED SYMBOLS) | | | | | 48 COINS |
| SPECIAL GAME MINIMUM GUARANTEE | | | | | 2 COINS |
| ⋮ | | | | | |

FIG. 4G

| 28a | 28b | 28c | 28d | 28e | PAYOUT |
|---|---|---|---|---|---|
| APPLE | APPLE | APPLE | APPLE | APPLE | BONUS GAME |
| BELL | BELL | BELL | BELL | BELL | 25 COINS |
| CHERRY | CHERRY | CHERRY | CHERRY | CHERRY | 20 COINS |
| PLUM | PLUM | PLUM | PLUM | PLUM | 5 COINS |
| ⋮ | ⋮ | ⋮ | ⋮ | ⋮ | ⋮ |
| SYMBOL COMBINATION OF 6 BELLS | | | | | 3 COINS |
| SYMBOL COMBINATION OF 6 (PLAYER-SELECTED SYMBOLS) | | | | | 96 COINS |
| SPECIAL GAME MINIMUM GUARANTEE | | | | | 2 COINS |
| ⋮ | | | | | |

FIG. 4H

| 28a | 28b | 28c | 28d | 28e | PAYOUT |
|---|---|---|---|---|---|
| APPLE | APPLE | APPLE | APPLE | APPLE | BONUS GAME |
| BELL | BELL | BELL | BELL | BELL | 25 COINS |
| CHERRY | CHERRY | CHERRY | CHERRY | CHERRY | 20 COINS |
| PLUM | PLUM | PLUM | PLUM | PLUM | 5 COINS |
| ... | ... | ... | ... | ... | ... |
| SYMBOL COMBINATION OF 6 BELLS | | | | | 3 COINS |
| SYMBOL COMBINATION OF 6 (PLAYER-SELECTED SYMBOLS) | | | | | 192 COINS |
| SPECIAL GAME MINIMUM GUARANTEE | | | | | 2 COINS |
| ... | | | | | |

FIG. 4I

| 28a | 28b | 28c | 28d | 28e | PAYOUT |
|---|---|---|---|---|---|
| APPLE | APPLE | APPLE | APPLE | APPLE | BONUS GAME |
| BELL | BELL | BELL | BELL | BELL | 25 COINS |
| CHERRY | CHERRY | CHERRY | CHERRY | CHERRY | 20 COINS |
| PLUM | PLUM | PLUM | PLUM | PLUM | 5 COINS |
| ⋮ | ⋮ | ⋮ | ⋮ | ⋮ | ⋮ |
| SYMBOL COMBINATION OF 6 BELLS | | | | | 3 COINS |
| SYMBOL COMBINATION OF 6 (PLAYER-SELECTED SYMBOLS) | | | | | 384 COINS |
| SPECIAL GAME MINIMUM GUARANTEE | | | | | 2 COINS |
| ⋮ | | | | | |

FIG. 4J

| 28a | 28b | 28c | 28d | 28e | PAYOUT |
|---|---|---|---|---|---|
| APPLE | APPLE | APPLE | APPLE | APPLE | BONUS GAME |
| BELL | BELL | BELL | BELL | BELL | 25 COINS |
| CHERRY | CHERRY | CHERRY | CHERRY | CHERRY | 20 COINS |
| PLUM | PLUM | PLUM | PLUM | PLUM | 5 COINS |
| ⋮ | ⋮ | ⋮ | ⋮ | ⋮ | ⋮ |
| SYMBOL COMBINATION OF 6 BELLS | | | | | 3 COINS |
| SYMBOL COMBINATION OF 6 (PLAYER-SELECTED SYMBOLS) | | | | | 768 COINS |
| SPECIAL GAME MINIMUM GUARANTEE | | | | | 2 COINS |
| ⋮ | | | | | |

FIG. 4K

| 28a | 28b | 28c | 28d | 28e | PAYOUT |
|---|---|---|---|---|---|
| APPLE | APPLE | APPLE | APPLE | APPLE | BONUS GAME |
| BELL | BELL | BELL | BELL | BELL | 25 COINS |
| CHERRY | CHERRY | CHERRY | CHERRY | CHERRY | 20 COINS |
| PLUM | PLUM | PLUM | PLUM | PLUM | 5 COINS |
| ⋮ | ⋮ | ⋮ | ⋮ | ⋮ | ⋮ |
| SYMBOL COMBINATION OF 6 BELLS | | | | | 3 COINS |
| SYMBOL COMBINATION OF 6 (PLAYER-SELECTED SYMBOLS) | | | | | 1536 COINS |
| SPECIAL GAME MINIMUM GUARANTEE | | | | | 2 COINS |
| ⋮ | | | | | |

FIG. 4L

| 28a | 28b | 28c | 28d | 28e | PAYOUT |
|---|---|---|---|---|---|
| APPLE | APPLE | APPLE | APPLE | APPLE | BONUS GAME |
| BELL | BELL | BELL | BELL | BELL | 25 COINS |
| CHERRY | CHERRY | CHERRY | CHERRY | CHERRY | 20 COINS |
| PLUM | PLUM | PLUM | PLUM | PLUM | 5 COINS |
| ⋮ | ⋮ | ⋮ | ⋮ | ⋮ | ⋮ |
| SYMBOL COMBINATION OF 6 BELLS | | | | | SPECIAL GAME |
| ⋮ | | | | | |

FIG. 4M

| 28a | 28b | 28c | 28d | 28e | PAYOUT |
|---|---|---|---|---|---|
| APPLE | APPLE | APPLE | APPLE | APPLE | BONUS GAME |
| BELL | BELL | BELL | BELL | BELL | 25 COINS |
| CHERRY | CHERRY | CHERRY | CHERRY | CHERRY | 20 COINS |
| PLUM | PLUM | PLUM | PLUM | PLUM | 5 COINS |
| ⋮ | ⋮ | ⋮ | ⋮ | ⋮ | ⋮ |
| SYMBOL COMBINATION OF 6 BELLS | | | | | SPECIAL GAME |
| SPECIAL GAME | | | | | 2 COINS WHEN SPECIAL GAME TERMINATES |
| ⋮ | | | | | |

FIG. 4N

| 28a | 28b | 28c | 28d | 28e | PAYOUT |
|---|---|---|---|---|---|
| APPLE | APPLE | APPLE | APPLE | APPLE | BONUS GAME |
| BELL | BELL | BELL | BELL | BELL | 25 COINS |
| CHERRY | CHERRY | CHERRY | CHERRY | CHERRY | 20 COINS |
| PLUM | PLUM | PLUM | PLUM | PLUM | 5 COINS |
| ... | ... | ... | ... | ... | ... |
| SYMBOL COMBINATION OF 6 BELLS | | | | | SPECIAL GAME |
| SPECIAL GAME | | | | | 3 COINS WHEN SPECIAL GAME TERMINATES |
| ... | | | | | |

FIG. 40

| 28a | 28b | 28c | 28d | 28e | PAYOUT |
|---|---|---|---|---|---|
| APPLE | APPLE | APPLE | APPLE | APPLE | BONUS GAME |
| BELL | BELL | BELL | BELL | BELL | 25 COINS |
| CHERRY | CHERRY | CHERRY | CHERRY | CHERRY | 20 COINS |
| PLUM | PLUM | PLUM | PLUM | PLUM | 5 COINS |
| ⋮ | ⋮ | ⋮ | ⋮ | ⋮ | ⋮ |
| SYMBOL COMBINATION OF 6 BELLS | | | | | SPECIAL GAME |
| SPECIAL GAME | | | | | 6 COINS WHEN SPECIAL GAME TERMINATES |
| ⋮ | | | | | |

FIG. 4P

| 28a | 28b | 28c | 28d | 28e | PAYOUT |
|---|---|---|---|---|---|
| APPLE | APPLE | APPLE | APPLE | APPLE | BONUS GAME |
| BELL | BELL | BELL | BELL | BELL | 25 COINS |
| CHERRY | CHERRY | CHERRY | CHERRY | CHERRY | 20 COINS |
| PLUM | PLUM | PLUM | PLUM | PLUM | 5 COINS |
| ⋮ | ⋮ | ⋮ | ⋮ | ⋮ | ⋮ |
| SYMBOL COMBINATION OF 6 BELLS | | | | | SPECIAL GAME |
| SPECIAL GAME | | | | | 12 COINS WHEN SPECIAL GAME TERMINATES |
| ⋮ | | | | | |

FIG. 4Q

| 28a | 28b | 28c | 28d | 28e | PAYOUT |
|---|---|---|---|---|---|
| APPLE | APPLE | APPLE | APPLE | APPLE | BONUS GAME |
| BELL | BELL | BELL | BELL | BELL | 25 COINS |
| CHERRY | CHERRY | CHERRY | CHERRY | CHERRY | 20 COINS |
| PLUM | PLUM | PLUM | PLUM | PLUM | 5 COINS |
| ⋮ | ⋮ | ⋮ | ⋮ | ⋮ | ⋮ |
| SYMBOL COMBINATION OF 6 BELLS | | | | | SPECIAL GAME |
| SPECIAL GAME | | | | | 24 COINS WHEN SPECIAL GAME TERMINATES |
| ⋮ | | | | | |

FIG. 4R

| 28a | 28b | 28c | 28d | 28e | PAYOUT |
|---|---|---|---|---|---|
| APPLE | APPLE | APPLE | APPLE | APPLE | BONUS GAME |
| BELL | BELL | BELL | BELL | BELL | 25 COINS |
| CHERRY | CHERRY | CHERRY | CHERRY | CHERRY | 20 COINS |
| PLUM | PLUM | PLUM | PLUM | PLUM | 5 COINS |
| ⋮ | ⋮ | ⋮ | ⋮ | ⋮ | ⋮ |
| SYMBOL COMBINATION OF 6 BELLS | | | | | SPECIAL GAME |
| SPECIAL GAME | | | | | 48 COINS WHEN SPECIAL GAME TERMINATES |
| ⋮ | | | | | |

FIG. 4S

| 28a | 28b | 28c | 28d | 28e | PAYOUT |
|---|---|---|---|---|---|
| APPLE | APPLE | APPLE | APPLE | APPLE | BONUS GAME |
| BELL | BELL | BELL | BELL | BELL | 25 COINS |
| CHERRY | CHERRY | CHERRY | CHERRY | CHERRY | 20 COINS |
| PLUM | PLUM | PLUM | PLUM | PLUM | 5 COINS |
| ⋮ | ⋮ | ⋮ | ⋮ | ⋮ | ⋮ |
| SYMBOL COMBINATION OF 6 BELLS | | | | | SPECIAL GAME |
| SPECIAL GAME | | | | | 96 COINS WHEN SPECIAL GAME TERMINATES |
| ⋮ | | | | | |

FIG. 4T

| 28a | 28b | 28c | 28d | 28e | PAYOUT |
|---|---|---|---|---|---|
| APPLE | APPLE | APPLE | APPLE | APPLE | BONUS GAME |
| BELL | BELL | BELL | BELL | BELL | 25 COINS |
| CHERRY | CHERRY | CHERRY | CHERRY | CHERRY | 20 COINS |
| PLUM | PLUM | PLUM | PLUM | PLUM | 5 COINS |
| ⋮ | ⋮ | ⋮ | ⋮ | ⋮ | ⋮ |
| SYMBOL COMBINATION OF 6 BELLS | | | | | SPECIAL GAME |
| SPECIAL GAME | | | | | 192 COINS WHEN SPECIAL GAME TERMINATES |
| ⋮ | | | | | |

FIG. 4U

| 28a | 28b | 28c | 28d | 28e | PAYOUT |
|---|---|---|---|---|---|
| APPLE | APPLE | APPLE | APPLE | APPLE | BONUS GAME |
| BELL | BELL | BELL | BELL | BELL | 25 COINS |
| CHERRY | CHERRY | CHERRY | CHERRY | CHERRY | 20 COINS |
| PLUM | PLUM | PLUM | PLUM | PLUM | 5 COINS |
| ⋮ | ⋮ | ⋮ | ⋮ | ⋮ | ⋮ |
| SYMBOL COMBINATION OF 6 BELLS | | | | | SPECIAL GAME |
| SPECIAL GAME | | | | | 384 COINS WHEN SPECIAL GAME TERMINATES |
| ⋮ | | | | | |

FIG. 4V

| 28a | 28b | 28c | 28d | 28e | PAYOUT |
|---|---|---|---|---|---|
| APPLE | APPLE | APPLE | APPLE | APPLE | BONUS GAME |
| BELL | BELL | BELL | BELL | BELL | 25 COINS |
| CHERRY | CHERRY | CHERRY | CHERRY | CHERRY | 20 COINS |
| PLUM | PLUM | PLUM | PLUM | PLUM | 5 COINS |
| ⋮ | ⋮ | ⋮ | ⋮ | ⋮ | ⋮ |
| SYMBOL COMBINATION OF 6 BELLS | | | | | SPECIAL GAME |
| SPECIAL GAME | | | | | 768 COINS WHEN SPECIAL GAME TERMINATES |
| ⋮ | | | | | |

FIG. 4W

| 28a | 28b | 28c | 28d | 28e | PAYOUT |
|---|---|---|---|---|---|
| APPLE | APPLE | APPLE | APPLE | APPLE | BONUS GAME |
| BELL | BELL | BELL | BELL | BELL | 25 COINS |
| CHERRY | CHERRY | CHERRY | CHERRY | CHERRY | 20 COINS |
| PLUM | PLUM | PLUM | PLUM | PLUM | 5 COINS |
| ... | ... | ... | ... | ... | ... |
| SYMBOL COMBINATION OF 6 BELLS | | | | | SPECIAL GAME |
| SPECIAL GAME | | | | | 1,536 COINS WHEN SPECIAL GAME TERMINATES |
| | | ... | | | |

SLOT MACHINE AND PLAYING METHOD THEREOF

CROSS-REFERENCE TO RELATED APPLICATION

This application is based upon and claims the benefit of U.S. Provisional Patent Application Ser. No. 60/842,018, filed on Sep. 5, 2006; the entire contents of which are incorporated herein by reference for all purposes.

BACKGROUND OF THE INVENTION

1. Field of the Invention

The present invention relates to a slot machine that executes games using game media such as coins or bills, and a playing method thereof.

2. Description of Related Art

As a conventional slot machine, such as one disclosed in U.S. Pat. No.6604999B2 is known, in which, payout is made for the rearrangement of a winning combination on a payline on a display or for the rearrangement of a predetermined number or more of predetermined symbols on the display.

Further, in U.S. Pat. No.6,093,102A, a slot machine is disclosed, which makes payout when a winning combination is rearranged on a payline the pattern of which can be increased in number by user's selection.

These slot machines make payout in accordance with a payout rate of a payout table determined in advance and the advent of a slot machine comprising new entertainment properties is desired.

SUMMARY OF THE INVENTION

The slot machine according to a first aspect of the present invention comprises a display and a controller. A plurality of symbols that have been arranged are rearranged on the display in a unit game. The controller is operable to execute a predetermined number of times of the unit game as a special game after a subgame has been executed. In the subgame, a specific symbol is selected from among a plurality of kinds of symbols by an external input. Further, the controller is operable to vary payout amount of credits for occurrence of an award accompanied by payout of credits due to the specific symbol during the predetermined number of times of the special game in accordance with the number of specific symbols rearranged on the display during the predetermined number of times of the special game, or to vary payout amount of credits when the predetermined number of times of the special game terminate in accordance with the number of times of occurrence of an award accompanied by payout of credits due to the specific symbol during the predetermined number of times of the special game.

The slot machine according to a second aspect of the present invention comprises a display and a controller. A plurality of symbols that have been arranged are rearranged on the display in a unit game. The controller is operable to execute a predetermined number of times of the unit game as a special game after a subgame has been executed. In the subgame, a specific symbol is selected from among a plurality of kinds of symbols by an external input. Further, the controller is operable to increase payout amount of credits for occurrence of an award accompanied by payout of credits due to the specific symbol during the predetermined number of times of the special game as the number of specific symbols rearranged on the display during the predetermined number of times of the special game increases, or to increase payout amount of credits when the predetermined number of times of the special game terminate as the number of times of occurrence of an award accompanied by payout of credits due to the specific symbol during the predetermined number of times of the special game increases.

The slot machine according to a third aspect of the present invention comprises a display and a controller. A plurality of symbols that have been arranged are rearranged on the display in a unit game. The controller is operable to execute a predetermined number of times of the unit game as a special game after a subgame has been executed. In the subgame, a specific symbol is selected from among a plurality of kinds of symbols by an external input. Further, the controller is operable to increase payout amount of credits for occurrence of an award accompanied by payout of credits due to the specific symbol during the predetermined number of times of the special game as the number of specific symbols rearranged on the display during the predetermined number of times of the special game increases, and to terminate the special game when the award accompanied by the payout of credits due to the specific symbol occurs.

The slot machine according to a fourth aspect of the present invention comprises a display and a controller. A plurality of symbols that have been arranged are rearranged on the display in a unit game. The controller is operable to execute a predetermined number of times of the unit game as a special game after a subgame has been executed. In the subgame, a specific symbol is selected from among a plurality of kinds of symbols by an external input. Further, the controller is operable to increase payout amount of credits when the predetermined number of times of the special game terminate as the number of times of occurrence of an award accompanied by payout of credits due to the specific symbol during the predetermined number of times of the special game increases, and to set payout amount of credits when the predetermined number of times of the special game terminate to a predetermined minimum amount when the number of times of occurrence of an award accompanied by payout of credits due to the specific symbol during the predetermined number of times of the special game is zero.

With the playing method of the slot machine according to a fifth aspect of the present invention, a predetermined number of times of the unit game is executed as a special game after a subgame has been executed. In the subgame, a specific symbol is selected from among a plurality of kinds of symbols by an external input. Then payout amount of credits for occurrence of an award accompanied by payout of credits due to the specific symbol during the predetermined number of times of the special game is varied in accordance with the number of specific symbols rearranged on a display during the predetermined number of times of the special game. Alternatively, payout amount of credits at the end of the predetermined number of times of the special game is varied in accordance with the number of times of occurrence of an award accompanied by payout of credits due to the specific symbol during the predetermined number of times of the special game.

With the playing method of the slot machine according to a sixth aspect of the present invention, a predetermined number of times of a unit game is executed as a special game after a subgame has been executed. In the subgame, a specific symbol is selected from among a plurality of kinds of symbols by an external input. Then payout amount of credits for occurrence of an award accompanied by payout of credits due to the specific symbol during the predetermined number of times of the special game is increased as the number of specific symbols rearranged on a display during the predetermined number of times of the special game increases. Alternatively, payout amount of credits at the end of the predetermined number of times of the special game is increased as the number of times of occurrence of an award accompanied by payout of credits due to the specific symbol during the predetermined number of times of the special game increases.

With the playing method of the slot machine according to a seventh aspect of the present invention, a predetermined number of times of a unit game is executed as a special game after a subgame has been executed. In the subgame, a specific symbol is selected from among a plurality of kinds of symbols by an external input. Then payout amount of credits for occurrence of an award accompanied by payout of credits due to the specific symbol during the predetermined number of times of the special game is increased as the number of specific symbols rearranged on a display during the predetermined number of times of the special game increases, and the special game is terminated when the award accompanied by payout of credits due to the specific symbol occurs.

With the playing method of the slot machine according to a eighth aspect of the present invention, a predetermined number of times of the unit game is executed as a special game after a subgame has been executed. In the subgame, a specific symbol is selected from among a plurality of kinds of symbols by an external input. And payout amount of credits at the end of the predetermined number of times of the special game is set to a predetermined minimum amount when the number of times of occurrence of the award accompanied by the payout of credits due to the specific symbol during the predetermined number of times of the special game is zero.

BRIEF DESCRIPTION OF THE DRAWINGS

FIG. 3 is a diagram showing symbols and code numbers of the respective symbols to be displayed on five-column display areas of a slot machine according to the first embodiment and the second embodiment of the present invention.

FIG. 4A is a diagram showing a standard payout table indicating the relationship between combinations for which payout will be made and payout amounts, which is applied to a base game of the slot machine according to the first embodiment of the present invention.

FIG. 4B to FIG. 4K are diagrams each showing a payout table for a special game indicating the relationship between combinations for which payout will be made and payout amounts, which is applied to a special game of the slot machine according to the first embodiment of the present invention.

FIG. 4L is a diagram showing a standard payout table indicating the relationship between combinations for which payout will be made and payout amounts, which is applied to a base game of the slot machine according to the second embodiment of the present invention.

FIG. 4M to FIG. 4W are diagrams each showing a payout table for a special game indicating the relationship between combinations for which payout will be made and payout amounts, which is applied to a special game of the slot machine according to the second embodiment of the present invention.

DETAILED DESCRIPTION OF THE EMBODIMENT

Figure 1:
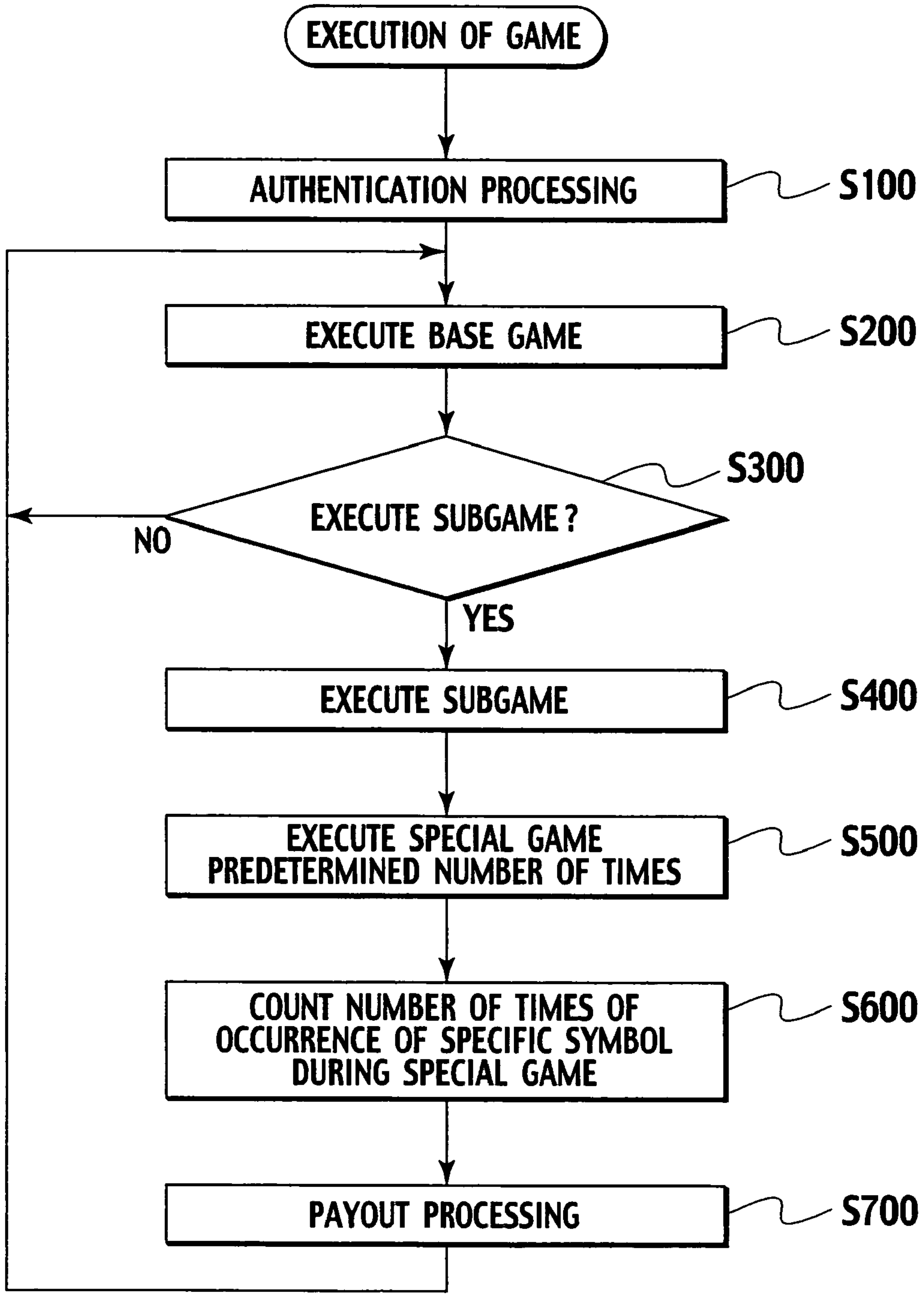
FIG. 1 is a flow chart generally showing a playing method of a slot machine according to the present invention.

FIG. 1 is a flow chart generally showing a playing method of a slot machine according to the present invention. The general operation of the slot machine and the playing method according to the present invention will be described below with reference to the flow chart shown in FIG. 1 and the perspective view shown in FIG. 2.

When the slot machine according to the present invention is powered on and starts up, authentication processing is executed first (step S100). In this authentication processing, initial checking processing is executed, prior to the start of a unit game (base game, second game, etc.), in order to determine whether the program for operating the system operates normally or not, whether there is any altercation of program or not, etc.

Next, the base game is executed (step S200). The base game is executed by a trigger when a spin button 23 is pressed by a player in a state in which a desired number of credits are bet, such as by the player inserting a coin into a coin insertion slot 21.

Then, in the base game, scrolling of symbols on each of display areas 28 (28*a* to 28*e*) of a liquid crystal display 17 inside 5-column×3-row display windows 15 (15*a* to 15*e*) provided on a lower display panel of a cabinet 11 is started and then, the scrolling is terminated to stop (rearrange) the symbol on each of the display areas 28.

Here, the slot machine according to the present invention executes processing to determine the symbol to be stopped on each of the display areas 28 (28*a* to 28*e*) and at the same time, determining whether or not to execute a subgame to select a specific symbol from among all the symbols that can be displayed on each of the display areas 28 (28*a* to 28*e*), that is, from among the symbols "JACKPOT 7", "BLUE 7", "BELL", "CHERRY", "STRAWBERRY", "PLUM", "ORANGE", "APPLE", "LOBSTER", and "CRAB" (step S300).

Then, when it is determined that the subgame is executed (YES in step S300), the subgame is executed (step S400).

Selection of a specific symbol in the subgame can be executed by, for example, using the display of each of the symbols "JACKPOT 7", "BLUE 7", "BELL", "CHERRY", "STRAWBERRY", "PLUM", "ORANGE", "APPLE", "LOBSTER", and "CRAB" on each of symbol display areas 14*a* to 14*j* of a symbol selecting display 14 provided below the display windows 15.

In other words, when the symbol display areas 14*a* to 14*j* on which a desired symbol is displayed, among the symbols respectively displayed on each of the display areas 14*a* to 14*j*, are selectively touched and operated by the player, input signals in correspondence with the symbol display areas 14*a* to 14*j* touched and operated are output from a touch screen 69 (refer to FIG. 5) provided on the front of the lower display panel 16.

Consequently, it is possible for the slot machine according to the present invention to recognize the selected specific symbol by handling the input signal from the touch screen 69 as an external input and discriminating the symbol display areas 14*a* to 14*j* touched by the player.

It is also possible to make discrimination by constituting each of the symbol display areas 14*a* to 14*j* of the symbol selecting display 14 by push button switches and detecting the symbol display areas 14*a* to 14*j* pressed by the player with the input signals from the push button switches. In this case, it follows that the input signal from the push button switch corresponds to the external input.

When the subgame is executed, the slot machine according to the present invention executes a special game a predetermined number of times (step S500).

In each special game, the slot machine according to the present invention starts scrolling of the symbols on each of the display areas 28 (28*a* to 28*e*) when the spin button 23 is pressed by the player as a trigger and then terminates the scrolling to stop the symbols on each of the display areas 28.

Then, the slot machine according to the present invention counts the number of times of the occurrence of the specific symbol selected in the subgame during the special game (step S600).

As to the count of the number of times of the occurrence of the specific symbol during the special game, specifically, the slot machine according to the present invention performs the count of the following number of times or number of symbols when, for example, the symbol "PLUM" is selected as a specific symbol in the subgame.

In other words, the slot machine according to the present invention counts the number of times the combination of the symbols "PLUM" selected in the subgame, which establishes an award accompanied by payout of credit, stops on each of the display areas 28 as the number of times of the occurrence of the specific symbol during the special game.

Figure 18A:
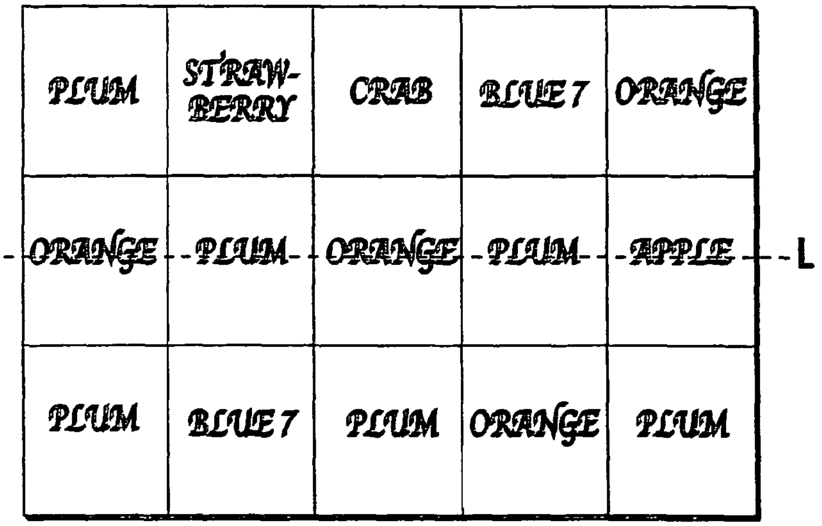
FIG. 18A is a diagram showing a display example when a combination including a predetermined number or more of specific symbols "PLUM" selected by a player at the start of the special game.
Figure 18B:
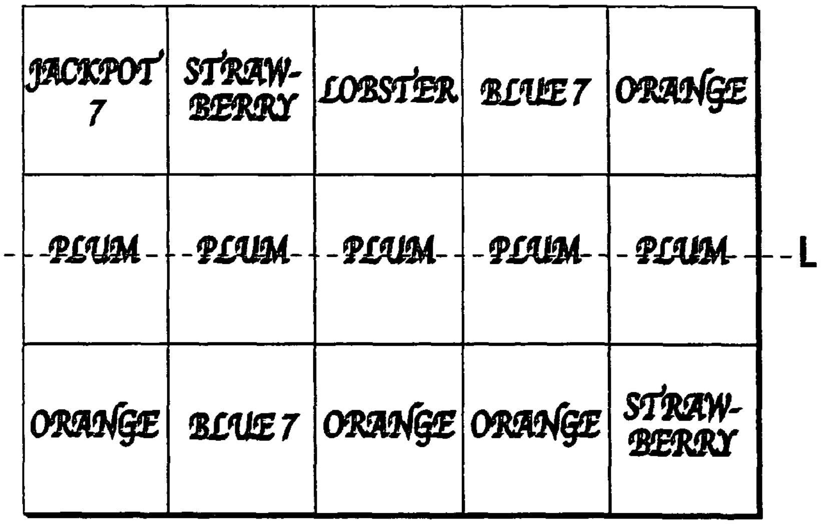
FIG. 18B is a diagram showing a display example when the winning combination of the symbols "PLUM" selected by the player is rearranged on the payline.

Combinations of the symbols "PLUM" selected in the subgame, which establish an award accompanied by payout of credit, include, for example, a combination including a predetermined number (for example, six) or more of the symbols "PLUM" as shown in FIG. 18A and a winning combination of the symbols "PLUM" having stopped on the payline L as shown in FIG. 18B.

Figure 18C:
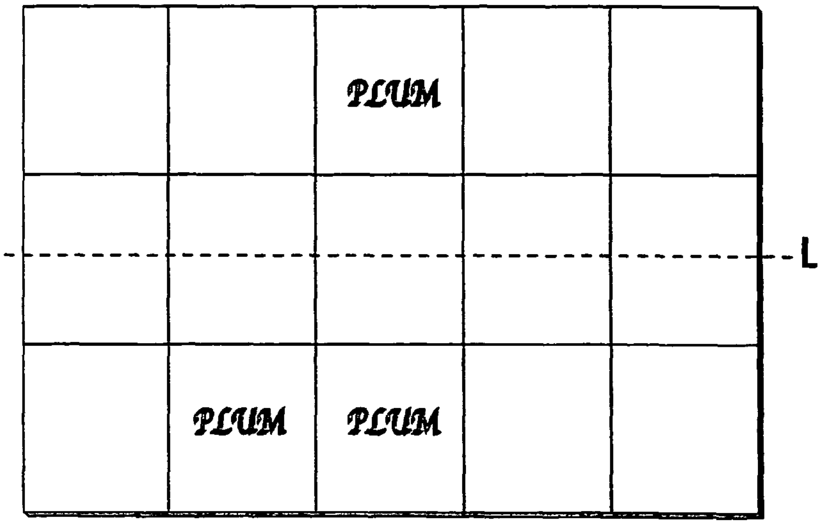
FIG. 18C is a diagram showing a display example when the specific symbol "PLUM" selected by the player is included in the rearranged winning combination.

Alternatively, the slot machine according to the present invention counts the number of rearranged (accumulated) symbols "PLUM" selected in the subgame, included in the combination of the symbols having stopped on each of the display areas 28 as shown in FIG. 18C as the number of times of the occurrence of the specific symbol during the special game.

Then, after a predetermined number of times of the special game terminate, the slot machine according to the present invention makes payout of credit in the payout amount in accordance with the number of times of the occurrence of the specific symbol, counted during the special game, and the processing returns to step S200 and the base game is executed.

Consequently, it follows that the slot machine according to the present invention varies the payout amount of credits to be paid out when a payout variable game terminates in accordance with the number of rearranged specific symbols selected in the subgame, or in accordance with the number of times of the occurrence of a combination that establishes an award accompanied by payout of credit due to the specific symbol.

Because of this, according to the slot machine according to the present invention, it is possible to further attract the interest of the user for the game by making the player expect that the payout amount of credits when the special game terminates will increase depending on the number of rearranged specific symbols selected in the subgame, or the number of times of the occurrence of an award accompanied by the payout of credit due to the specific symbol.

In the above-mentioned example, an example is explained, in which the symbols are caused to come to a stop on the display areas 28 (28*a* to 28*e*) corresponding to the 5-column× 3-row display windows 15 (15*a* to 15*e*), however, the present invention is not limited to the 5-column×3-row display areas 28.

Further, in the above-mentioned example, an example is explained, in which the symbol is displayed on each of the display areas 28 using the liquid crystal display 17, however, a configuration may be possible in which, cylinder-shaped, mechanical spinning reels on the side surface of which a plurality of symbols are drawn is used and after being rotated, the spinning reels are stopped to cause the symbol to come to a stop inside each of the display windows 15 (15*a* to 15*e*).

In addition, in the above-mentioned example, an example is shown, in which the symbols are scrolled vertically relative to each of the display areas 28 (28*a* to 28*e*) and subsequently stopped (rearranged) in the base game, however, the symbols may be switched over (rearranged) on each of the display areas 28 (28*a* to 28*e*).

Next, a configuration of a slot machine 10 according to a first embodiment of the present invention will be explained with reference to the perspective view shown in FIG. 2. The slot machine 10 is installed in a gaming facility.

With the slot machine 10, a coin, a bill, or electronic redeemable value information corresponding to these is used as game media for executing a unit game. However, in the present invention, the game media is not limited in particular and may include a medal, a token, an electronic money, or a ticket, for example. In addition, the above-mentioned ticket may include but not limited to a bar-coded ticket to be described below, for example.

Figure 2:
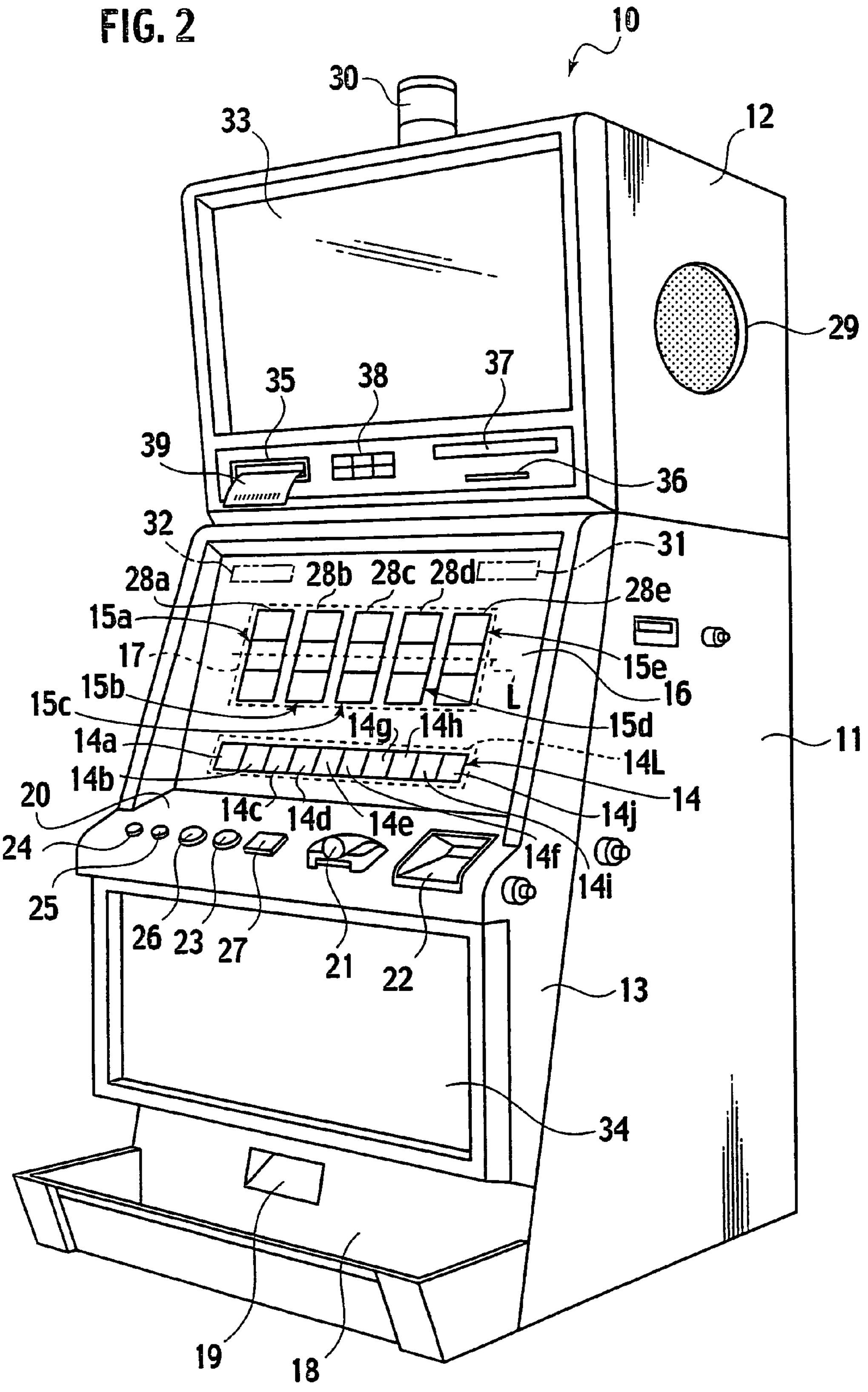
FIG. 2 is a perspective view showing the appearance of a slot machine according to a first embodiment and a second embodiment of the present invention.

As shown in FIG. 2, the slot machine 10 comprises a cabinet 11, a top box 12 provided on the top side of the cabinet 11, and a main door 13 provided on the front of the cabinet 11.

Inside the cabinet 11, the liquid crystal display 17 is provided for scrolling a 5-column×3-row matrix of symbols inside the display windows 15 (15*a* to 15*e*). The liquid crystal display 17 comprises the display areas 28 (28*a* to 28*e*) for displaying the 5-column×3-row matrix of symbols. In other words, when the base game is executed, the symbols are scrolled in the 5-column×3-row matrix of the display areas 28 (28*a* to 28*e*), allowing the player to view and recognize the symbols being scrolled through the display windows 15 (15*a* to 15*e*).

Here, in the present embodiment, the 5-column×3-row matrix of the display areas 28 (28*a* to 28*e*) of the liquid crystal display 17 is described as an exemplary display. However, the symbols may be displayed through the display windows 15 by spinning and subsequently stopping mechanical reels with the symbols displayed on their side. Also, the display areas 28 are not limited to the 5-column×3-row matrix.

In front of the liquid crystal display 17 in the main door 13 is provided the lower display panel 16. The lower display panel 16 has a transmissive liquid crystal panel to display, during the game, various pieces of information, effect images or the like relating to the game therein.

A credit display 31 and a payout display 32 are provided in the lower display panel 16. The number of coins having been credited is displayed as images on the credit display 31. On the payout display 32, the number of coins to be paid out when the symbol combination that has come to a stop on the payline L described below turns out to be a winning combination, and the number of coins to be paid out when a combination including a predetermined number (for example, six) or more of predetermined symbols has come to a stop are displayed as images.

On the lower display panel 16 is provided the 5-column display windows 15 ((15*a* to 15*e*) that allow visual recognition of the symbols displayed on the 5-column display areas 28 (28*a* to 28*e*) of the liquid crystal display 17 provided inside thereof. In addition, the single payline L horizontally crossing the display windows 15 (15*a* to 15*e*) is formed along the middle portion of the 5-column display windows 15 (15*a* to 15*e*). The payline L defines symbol combinations. When a symbol combination that has come to a stop on the payline L turns out to be a winning combination, coins in the number according to the winning combination and the number of coins inserted (number of bets) are paid out.

Here, in the present embodiment, an example is explained, in which the single payline L is provided. However, three paylines horizontally crossing the top, middle, and bottom portions of the five display windows 15 (15*a* to 15*e*), or a payline running diagonally (V-shaped, inverted V-shaped, etc.), for example, maybe formed, wherein the paylines in the number corresponding to the number of coins inserted are activated and when the symbol combination that has come to a stop on the activated paylines is a winning combination accompanied by payout, coins in the number according to the combination are paid out.

Further, below the display areas 28 of the lower display panel 16, the symbol selecting display 14 is provided.

The symbol selecting display 14 has the plurality of the symbol display areas 14*a* to 14*j* for individually displaying all the symbols that can be displayed on the display areas 28 (28*a* to 28*e*) by the liquid crystal display 17, that is, the "JACKPOT 7", "BLUE 7", "BELL", "CHERRY", "STRAWBERRY", "PLUM", "ORANGE", "APPLE", "LOBSTER", and "CRAB".

Each of the symbols display areas 14*a* to 14*j* can be lit up and displayed individually by a backlight 14L (refer to FIG. 5) arranged therebehind.

Further, on the front surface of the lower display panel 16, the touch screen 69 (refer to FIG. 5) is provided and it is possible for the player to input various commands by operating the touch screen 69.

Below the lower display panel 16 are provided a control panel 20 having a plurality of buttons 23 to 27 through which commands with regard to the progress of the game are entered by the player, the coin insertion slot 21 for accepting coins into the cabinet 11, and a bill validator 22.

On the control panel 20 are provided the spin button 23, a change button 24, a cash out button 25, a 1-bet button 26, and a maximum bet button 27. The spin button 23 is one for inputting a command to start scrolling of the symbols displayed on the display areas 28. The change button 24 is one used when requesting money exchange to the crew of a gaming facility. The cash out button 25 is one for inputting a command to pay out the credited coins onto a coin tray 18.

The 1-bet button 26 is one for inputting a command to bet a single coin on the game among the coins that have been credited. The maximum bet button 27 is one for inputting a command to bet on the game a maximum number (for example, 50) of coins allowed to be bet on a single game among those that have been credited.

The bill validator 22 identifies whether or not the bill is legitimate and accepts legitimate bills into the cabinet 11. Here, the bill validator 22 may be configured so as to be able to read a bar-coded ticket 39 to be described below. A berry glass 34 having characters of the slot machine 10 drawn thereon is provided on the lower front side of the main door 13, that is, below the control panel 20.

On the front surface of the top box 12 is provided an upper display panel 33. The upper display panel 33 comprises a liquid crystal panel to display images representing effect images, introduction of game contents, and explanation of the game rules, for example.

In addition, a loudspeaker 29 for audio output is provided on the top box 12. Below the upper display panel 33 are provided a ticket printer 35, a card reader 36, a data display unit 37, and a key pad 38. The ticket printer 35 prints bar codes on the ticket, which are coded data such as the number of credits, date/time, and the identification number of the slot machine 10 and outputs the ticket as the bar-coded ticket 39. The player can play games on other slot machines using the bar-coded ticket 39, or exchange the bar-coded ticket 39 with bills at the cashier of the gaming facility or the like.

The card reader 36 reads and writes data from and to a smart card. The smart card is a card carried by the player, and stores data used for identifying the players and data relating to the gaming history played by the player.

The data display unit 37 comprises a fluorescent display or the like, and displays data read by the card reader 36 or data entered by the player using the key pad 38, for example. Through the key pad 38, commands or data with regard to ticket issuance or the like are input.

FIG. 3 is an explanatory list of columns of symbols to be scrolled on each of the display areas 28 (28*a* to 28*e*) provided on the liquid crystal display 17 installed inside the cabinet 11. As shown in FIG. 3, columns of a total of 22 symbols composed of code numbers "00" to "21", respectively, are scrolled on each of the display areas 28 (28*a* to 28*e*) The columns of symbols are different for each of the display areas 28 (28*a* to 28*e*).

The symbols to be displayed on each of the display areas 28 (28*a* to 28*e*) are composed by combining the symbols "JACKPOT 7", "BLUE 7", "BELL", "CHERRY", "STRAWBERRY", "PLUM", "ORANGE", "APPLE", "LOBSTER", and "CRAB", and combinations of these symbols set combinations accompanied by payout.

The combinations accompanied by payout include combinations when winning combinations come to a stop on the payline L of the display windows 15 and combinations including a predetermined number (for example, six) or more of symbols "BELL".

Further, in the special game to be described later, a combination including a predetermined number (for example, six) or more of specific symbols selected by the player are added to the combinations accompanied by payout.

In addition, in the slot machine 10, a payout table for determining the payout amount (payout rate) when a combination accompanied by payout is achieved is set.

FIG. 4A is a diagram showing a standard payout table. The standard payout table is selected when the base game is executed alone and when both the base game and the special game are simultaneously executed, a payout table for the special game, which will be described later, is selected.

As shown in FIG. 4A, a bonus trigger is invoked when the symbols "APPLE" have come to a stop on the payline L on the five display areas 28 (28*a* to 28*e*), shifting the game state from the base game to the bonus game.

In addition, when a combination of the symbols "LOBSTER" or "BELL" has come to a stop on the payline L, payout of 25 coins is made. When the symbols "CHERRY" have come to a stop on the payline L, payout of 20 coins is made. When the symbols "PLUM" have come to a stop on the payline L, payout of five coins is made. When the six symbols "BELL" have come to a stop on the five display areas 28 (28*a* to 28*e*), payout of three coins is made.

The bonus game, which is executed when a combination of the symbols "APPLE" has come to a stop on the payline L, is a more advantageous game state than the base game. In the present embodiment, the bonus game is a free game (a game that can be played a predetermined number of times without betting coins). In the present invention, the bonus game is not particularly limited as long as it provides the player with an advantageous game state. Additionally, the bonus game that is advantageous for the player is not particularly limited as long as it is more advantageous than the base game. There may be a variety of more advantageous states such as a state in which more game media can be obtained than the base game, a state in which game media can be obtained with a higher probability than the base game, a state in which a smaller amount of game media is consumed than the base game, and so on. Specifically, bonus games may include a free game, a second game, or the like.

Scrolling of the symbols displayed (arranged) on each of the display areas 28 (28*a* to 28*e*) starts when the 1-bet button 26 or the maximum bet button 27 is pressed and, subsequently, the spin button 23 is pressed. After a predetermined time period has passed since the scrolling of respective symbols started, scrolling of respective symbols is stopped (rearranged). At this time, any symbols of the column of symbols on each of the display areas 28 (28*a* to 28*e*) shown in FIG. 3 come to a stop on the display areas 28 (28*a* to 28*e*) inside the display windows 15 (15*a* to 15*e*).

Furthermore, various winning combinations (refer to FIG. 4A) are predetermined for respective symbols and a certain number of coins according to the winning combination are added to the credits possessed by the player when symbols composing a winning combination have come to a stop on the payline L. In addition, when a bonus game is triggered, that is, when a combination of the five symbols "APPLE" has come to a stop on the payline L in the present embodiment, the game state shifts from the base game state to the bonus game state.

FIG. 4B to FIG. 4K are diagrams each showing a payout table for the special game. The payout table for the special game is selected when the special game simultaneously with the base game is being executed and not selected when the base game alone is being executed.

During the special game executed simultaneously with the base game, one payout table corresponding to the circumstances at that point of time is selected out of the payout tables for the special game in FIG. 4B to FIG. 4K and applied for payout.

The contents of the payout table for the special game shown in FIG. 4B are those in which a rate of payout of three coins for a combination including the six specific symbols selected by the player at the start of the special game is added to the standard payout table in FIG. 4A selected when the base game alone is being executed.

Further, the contents of the payout table for the special game shown in FIG. 4B are those in which the rate of payout of (three) coins when a combination including the six specific symbols selected by the player at the start of the special game comes to a stop on each of the display areas 28 and a guaranteed minimum payout number of (two) coins to be paid out when no payout is made during the special game for a combination including a predetermined number (for example, six) of specific symbols selected by the player that comes to a stop on each of the display areas 28 are added to the standard payout table in FIG. 4A.

On the other hand, the contents of the payout table for the special game shown in FIG. 4C to FIG. 4K are those in which the payout rate of coins for a combination including the six specific symbols selected by the player at the start of the special game is modified from three to three multiplied sequentially by powers of "two" (6, 12, 24, 48, 96, 192, 384, 768, 1,536).

In addition, the modified contents of the payout rate of coins for a combination including the six specific symbols selected by the payer in the payout table for the special game shown in FIG. 4C to FIG. 4K may be those in which the payout rate in the payout table for the special game in FIG. 4B increases from three to integer multiples of three, such as twice three (6), three times (9), four times (12), ten times (30) as long as it increases one after one, or those in which the number of coins increases in a pattern not related to integer multiples of three.

Figure 5:
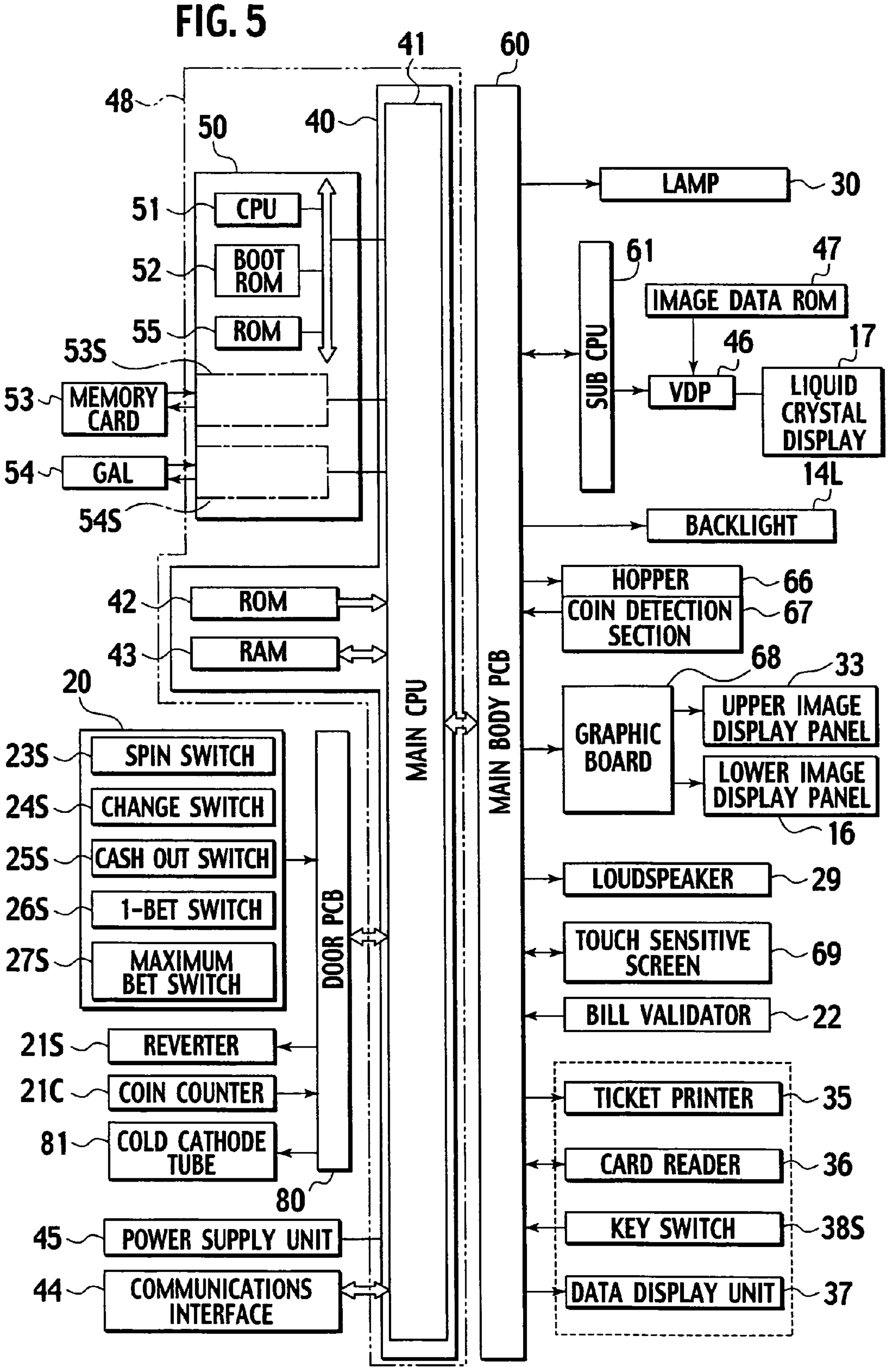
FIG. 5 is a block diagram showing a control circuit of the slot machine according to the first embodiment and the second embodiment of the present invention.

FIG. 5 is a block diagram showing a control circuit of the slot machine 10 shown in FIG. 2. As shown in FIG. 5, the control circuit comprises a motherboard 40, a main body PCB (Printed Circuit Board) 60, a gaming board 50, a sub CPU 61, a door PCB 80, and various types of components such as switches and sensors. The motherboard 40 and the gaming board 50 constitute a controller 48.

The gaming board 50 comprises a CPU (Central Processing Unit) 51, a ROM 55 and a boot ROM 52, which are connected to each other by an internal bus, a card slot 53S corresponding to a memory card 53, and an IC socket 54S corresponding to a GAL (Generic Array Logic) 54.

The Memory card 53 stores game programs and game system programs. The game programs include a symbol-to-be-stopped determination program. The symbol-to-be-stopped determination program is a program for determining the symbol (code number corresponding to the symbol) to be stopped on the payline L on each of the display areas 28 (28*a* to 28*e*). The symbol-to-be-stopped determination program includes symbol weighting data corresponding to each of a plurality of kinds of payout rates (for example, 80%, 84%, and 88%). The symbol weighting data indicates the relation between the code numbers (refer to FIG. 3) of respective symbols and one or a plurality of random number values within a predetermined numerical range (0 to 256), respectively for each of the 5-column display areas 28 (28*a* to 28*e*).

The payout rate is defined based on the payout rate setting data that is output from the GAL 54. Based on the symbol weighting data corresponding to the payout rate, the symbols to be stopped are determined.

In addition, the card slot 53S, configured so as to be capable of inserting therein and removing therefrom the memory card 53, is connected to the motherboard 40 by the IDE bus. Consequently, the type or contents of the game to be executed on the slot machine 10 can be changed by removing the memory card 53 from the card slot 53S, writing another game program and game system program in the memory card 53, and inserting the memory card 53 into the card slot 53S.

The game programs include a program relating to the progress of the game and a program for shifting the state to the bonus game. In addition, the game programs include image data and sound data to be output during the game.

The GAL 54 comprises a plurality of input ports and output ports and, when data is entered in an input port, outputs data corresponding to the entered data from an output port. The data output from the output port is the payout rate setting data described above.

In addition, the IC socket 54S, configured so as to be capable of attaching thereto and removing therefrom the GAL 54, is connected to the motherboard 40 by the PCI bus. Consequently, the payout rate setting data to be output from the GAL 54 can be changed by removing the GAL 54 from the IC socket 54S, rewriting the program to be stored in the GAL 54, and attaching the GAL 54 to the IC socket 54S.

The CPU 51, the ROM 55 and the boot ROM 52 connected to each other by an internal bus are connected to the motherboard 40 by the PCI bus. The PCI bus transmits signals between the motherboard 40 and the gaming board 50, as well as supplying power from the motherboard 40 to the gaming board 50. The ROM 55 stores country identification information and an authentication program. The boot ROM 52 stores a preliminary authentication program and a program (boot code) by which the CPU 51 starts the preliminary authentication program.

The authentication program is a program for authenticating the game program and the game system program (authentication check program). The authentication program is a program for checking and proving that the game program and the game system program have not been altered. In other words, the authentication program is written in accordance with the procedure of authenticating the game program and the game system program. The preliminary authentication program is a program for authenticating the authentication program described above. The preliminary authentication program is written in accordance with the procedure of authenticating the authentication program, that is, to prove that the authentication program supposed to execute the authentication processing has not been altered.

The motherboard 40 comprises a main CPU 41, a ROM (Read Only Memory) 42, a RAM (Random Access Memory) 43, and a communications interface 44.

The main CPU 41 comprises a function as a controller that controls the entire slot machine 10. In particular, the main CPU 41 controls, when credits have been bet and the spin button 23 is pressed by the player, outputting a command signal to cause the sub CPU 61 to scroll the symbols on each of the display areas 28 (28*a* to 28*e*) of the liquid crystal display 17, determining the symbols to be stopped at a position on the middle portion (on the payline L) after the symbols on each of the display areas 28 (28*a* to 28*e*) have been scrolled, and displaying the symbols in such a manner that the determined symbols stop on the pay line L.

In other words, the main CPU 41 controls the arrangement in order to rearrange, after putting a plurality of symbols displayed on the display (liquid crystal display 17) in a scrolling state, the symbols into a new symbol matrix, in such a manner that the symbols to be arranged into a symbol matrix are selected and determined from among a plurality of types of symbols and the determined symbols are stopped from the scrolling state.

Further, the main CPU 41 controls to cause payout to occur when a combination for which payout will be made is rearranged on each of the display areas 28 (28*a* to 28*e*) of the liquid crystal display 17.

Furthermore, the main CPU 41 controls a backlight 14L, which is capable of turning on and off separately for each part corresponding to each of the symbol display areas 14*a* to 14*j*, to turn on all together temporarily at the time of the start of the special game in order to cause the player to select a specific symbol by the contact operation of each of the symbol display areas 14*a* to 14*j* of the symbol selecting display 14.

Still furthermore, the main CPU 41 controls, while keeping lit the part of the backlight 14L corresponding to one of the symbol display areas contacted and operated by the player, for example, the symbol display area 14*f* of the "PLUM" of the backlight 14L, the other symbol display areas 14*a* to 14*e* and 14*g* to 14*j* to turn off in order to display the specific symbol selected by the player.

The ROM 42 stores programs such as the BIOS (Basic Input/Output System) executed by the main CPU 41 and also stores data to be used permanently. When the BIOS is executed by the main CPU 41, the initialization processing of each peripheral unit is executed and the read processing for reading the game program and the game system program stored in the memory card 53 via the gaming board 50 is started.

The RAM 43 stores data and programs used when the main CPU 41 executes the processing.

The communications interface 44 is for performing communication with the host computer and the like provided in the gaming facility via a communication line.

In addition, the main body PCB (Printed Circuit Board) 60 and the door PCB 80, which will be described below, are connected to the motherboard 40 by a USB (Universal Serial Bus), respectively. Furthermore, a power unit 45 is connected to the motherboard 40. When electric power is supplied to the motherboard 40 from the power unit 45, the main CPU 41 of the motherboard 40 is activated, and electric power is also supplied to the gaming board 50 via a PCI bus, activating the CPU 51.

Devices and units that generate input signals to be fed to the main CPU 41, as well as devices and units whose operation is controlled by control signals output from the main CPU 41 are connected to the main body PCB 60 and the door PCB 80. The main CPU 41 executes arithmetic processing and stores their result in the RAM 43, or transmits control signals to respective devices and units as control processing for the respective devices and units, by executing the game programs and the game system program stored in the RAM 43, based on input signals fed to the main CPU 41.

To the main body PCB 60, the sub CPU 61, a hopper 66, a coin detecting unit 67, a graphic board 68, the loudspeaker 29, the touch screen 69, the bill validator 22, the ticket printer 35, the card reader 36, a key switch 38S, the data display unit 37, and the backlight 14L are connected.

The sub CPU 61 controls the scrolling of the symbols on the 5-column display areas 28 (28*a* to 28*e*) provided on the liquid crystal display 17, and is connected to a VDP (Video Display Processor) 46.

The VDP 46 reads out the image data of symbols stored in an image data ROM 47, generates scroll images to be displayed on the liquid crystal display 17, and outputs the scroll images to the liquid crystal display 17.

The hopper 66 is provided inside the cabinet 11 and pays out a predetermined number of coins from a coin payout opening 19 onto the coin tray 18 based on control signals output from the main CPU 41. The coin detecting unit 67 is provided inside the coin payout opening 19 and outputs the input signal to the main CPU 41 when it detects that a predetermined number of coins have been paid out from the coin payout opening 19.

The graphic board 68 controls the display of symbols to be displayed on the display areas 28 and each symbol on each of the symbol display areas 14*a* to 14*j* of the symbol selecting display 14, and the display of other images except the turning on and off of each part corresponding to each of the symbol display areas 14*a* to 14*j* of the backlight 14L in the upper display panel 33 and the lower display panel 16, based on control signals output from the main CPU 41.

The number of credits stored in the RAM 43 is displayed on the credit display 31 of the lower display panel 16. In addition, the number of coins paid out is displayed on the payout display 32 of the lower display panel 16. Further, the graphic board 68 comprises a VDP for generating image data based on control signals output from the main CPU 41, a video RAM for temporarily storing the image data generated by the VDP, etc.

The bill validator 22 reads the images of the bills to accept legitimate bills into the cabinet 11. In addition, upon accepting a legitimate bill, the bill validator 22 outputs an input signal to the main CPU 41 according to the value of the bill. The main CPU 41 stores, in the RAM 43, the number of credits corresponding to the value of the bill, the value having been transmitted by the input signal.

The ticket printer 35 prints, based on control signals output from the main CPU 41, bar codes on the ticket expressing coded data such as the number of credits stored in the RAM 43, time and date, identification number of the slot machine 10, or the like, and outputs the ticket as the bar-coded ticket 39.

The card reader 36 reads data from the smart card and transmits the data to the main CPU 41, or writes data into the smart card based on control signals from the main CPU 41. The key switch 38S is provided on the key pad 38 and outputs, when the key pad 38 is operated by the player, the entered signal to the main CPU 41.

On the data display unit 37, the data read by the card reader 36 or the data entered via the key pad 38 by the player is displayed based on control signals output from the main CPU 41.

The control panel 20, a revertor 21S, a coin counter 21C, and a cold cathode tube 81 are connected to the door PCB 80. On the control panel 20, a spin switch 23S corresponding to the spin button 23, a change switch 24S corresponding to the change button 24, a cash out switch 25S corresponding to the cash out button 25, a 1-bet switch 26S corresponding to the 1-bet button 26, and a maximum bet switch 27S corresponding to the maximum bet button 27 are provided. The respective switches 23S to 27S output, when their corresponding buttons 23 to 27 are operated by the player, the input signals to the main CPU 41.

The coin counter 21C is provided inside the coin insertion slot 21 and discriminates whether or not the coin inserted into the coin insertion slot 21 by the player is legitimate. Coins other than legitimate ones are ejected from the coin payout opening 19. In addition, upon detecting a legitimate coin, the coin counter 21C outputs the input signal to the main CPU 41.

The revertor 21S operates based on control signals output from the main CPU 41 to sort the coins recognized as legitimate coins by the coin counter 21C to either the cashbox (not shown) or the hopper 66 provided inside the slot machine 10. In other words, when the hopper 66 is filled with coins, legitimate coins are sorted to the cashbox by the revertor 21S. On the other hand, when the hopper 66 is not filled with coins, legitimate coins will be sorted to the hopper 66.

The cold cathode tube 81 functions as a backlight provided on the backside of the lower display panel 16 and the upper display panel 33, and lights up based on control signals output from the main CPU 41.

Figure 6:
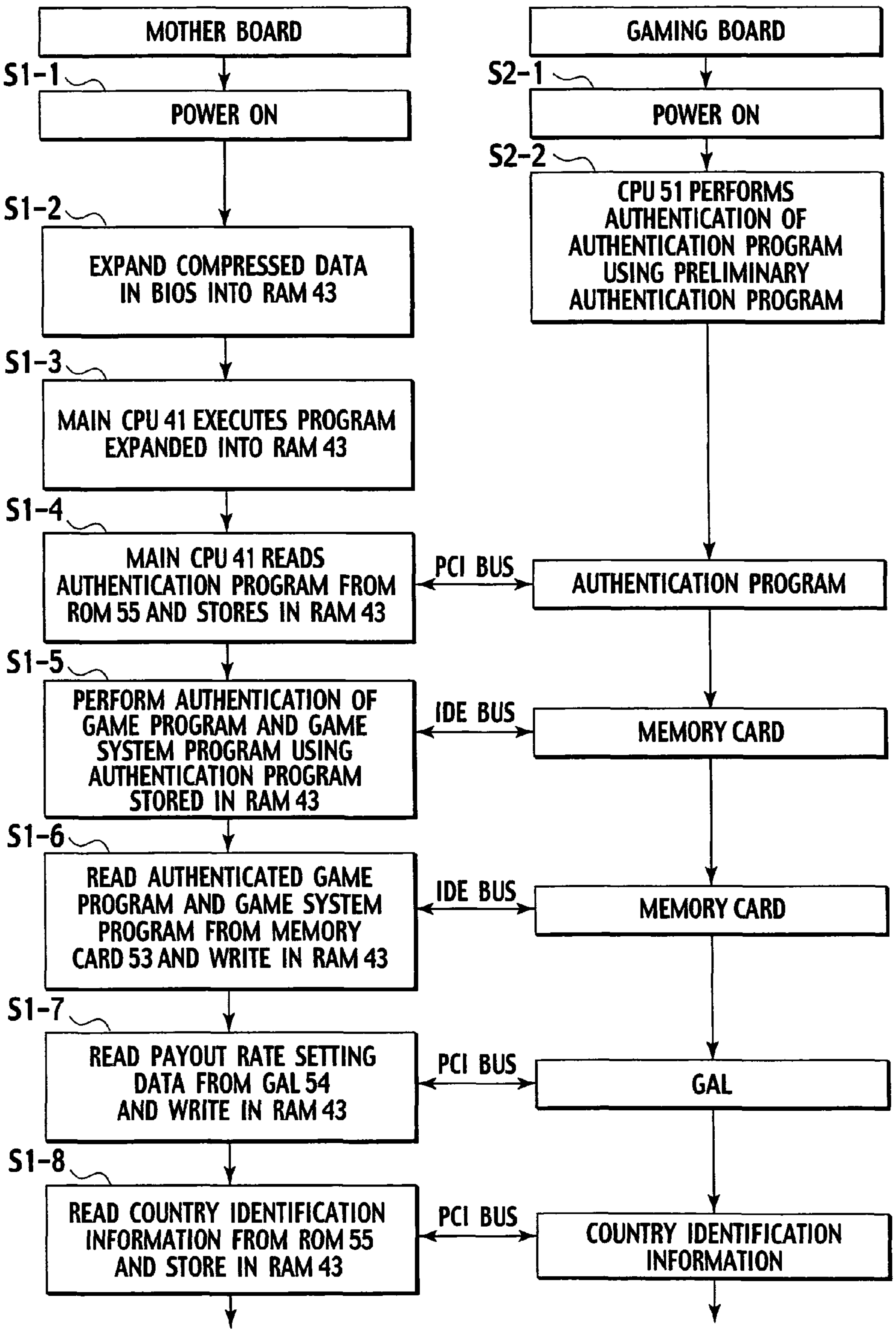
FIG. 6 is a flow chart showing the procedure of authentication reading processing of a game program and a game system program executed by a motherboard and a gaming board of the slot machine according to the first embodiment and the second embodiment of the present invention.

Next, specific processing executed in the slot machine 10 will be described. FIG. 6 is a flow chart showing the procedure (processing in step S100 shown in FIG. 1) of the authentication reading processing of the game program and the game system program executed by the motherboard 40 and the gaming board 50 shown in FIG. 5. Here, it is assumed that the memory card 53 is attached to the card slot 53S on the gaming board 50, and the GAL 54 is attached to the IC socket 54S.

First, when the power switch is turned on in the power unit 45, the motherboard 40 and the gaming board 50 are activated (steps S1-1 and S2-1). When the motherboard 40 and the gaming board 50 are activated, processing is executed respectively and individually in parallel. In other words, in the gaming board 50, the CPU 51 reads out the preliminary authentication program stored in the boot ROM 52 and executes a preliminary authentication in accordance with the read-out preliminary authentication program to check and prove, before being taken into the motherboard 40, that the authentication program has not been altered (step S2-2).

On the other hand, in the motherboard 40, the main CPU 41 executes the BIOS stored in the ROM 42 and decompresses the compressed data embedded in the BIOS into the RAM 43 (step S1-2). Then the main CPU 41 executes the BIOS that has been expanded into the RAM 43 and executes diagnosis and initialization of various peripheral units (step S1-3).

Then, since the ROM 55 of the gaming board 50 is connected to the main CPU 41 via the PCI bus, the main CPU 41 reads out the authentication program stored in the ROM 55. Furthermore, the main CPU 41 executes processing to store the read-out authentication program in the RAM 43 (step S1-4).

Next, the main CPU 41 accesses the memory card 53 attached to the card slot 53S via the IDE bus. Then, the main CPU 41 reads out the game program and the game system program stored in the memory card 53.

Next, the main CPU 41 executes authentication to check and prove, in accordance with the authentication program stored in the RAM 43, that the read-out game program and the game system program have not been altered (step S1-5).

If the authentication processing is completed normally, the main CPU 41 stores the authenticated game program and game system program into the RAM 43 (step S1-6). Next, the main CPU 41 accesses the GAL 54 attached to the IC socket 54S via the PCI bus, and reads the payout rate setting data from GAL 54 and stores it into the RAM 43 (step S1-7). Next, the main CPU 41 reads the country identification information stored in the ROM 55 of the gaming board 50 via the PCI bus, and stores the read-out country identification information in the RAM 43 (step S1-8).

After executing the above-mentioned processing, the main CPU 41 makes the base game progress as described below, by sequentially reading out and executing the game program and the game system program.

Figure 7:
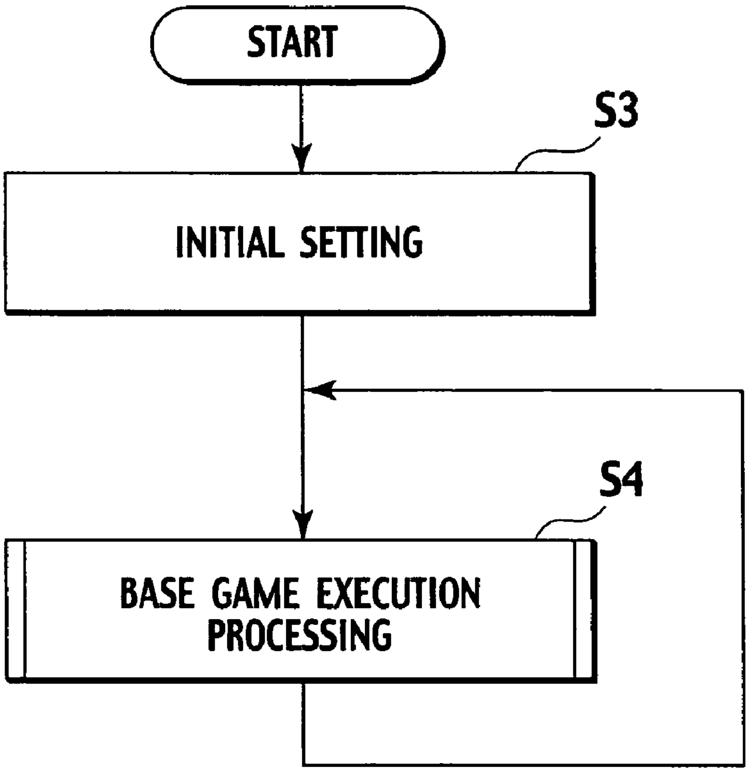
FIG. 7 is a flow chart showing a part of the processing procedure executed by the slot machine according to the first embodiment and the second embodiment of the present invention.

First, after the authentication reading processing shown in FIG. 6 has been executed, the main CPU 41 performs the initial setting (step S3) and then, performs the execution processing of the base game (step S4) as shown in the flow chart in FIG. 7.

In the initial setting, the main CPU 41 sets a flag F of the RAM 43 indicating whether or not the special game is being executed to "0" and at the same time, resetting to zero a count value M of a counter of the number of stopped symbols of the RAM 43 indicating the number of stopped symbols selected by the player during the special game and resetting to zero a count value N of a counter of the number of execution times of the RAM indicating the number of times of execution of the special game.

Figure 8:
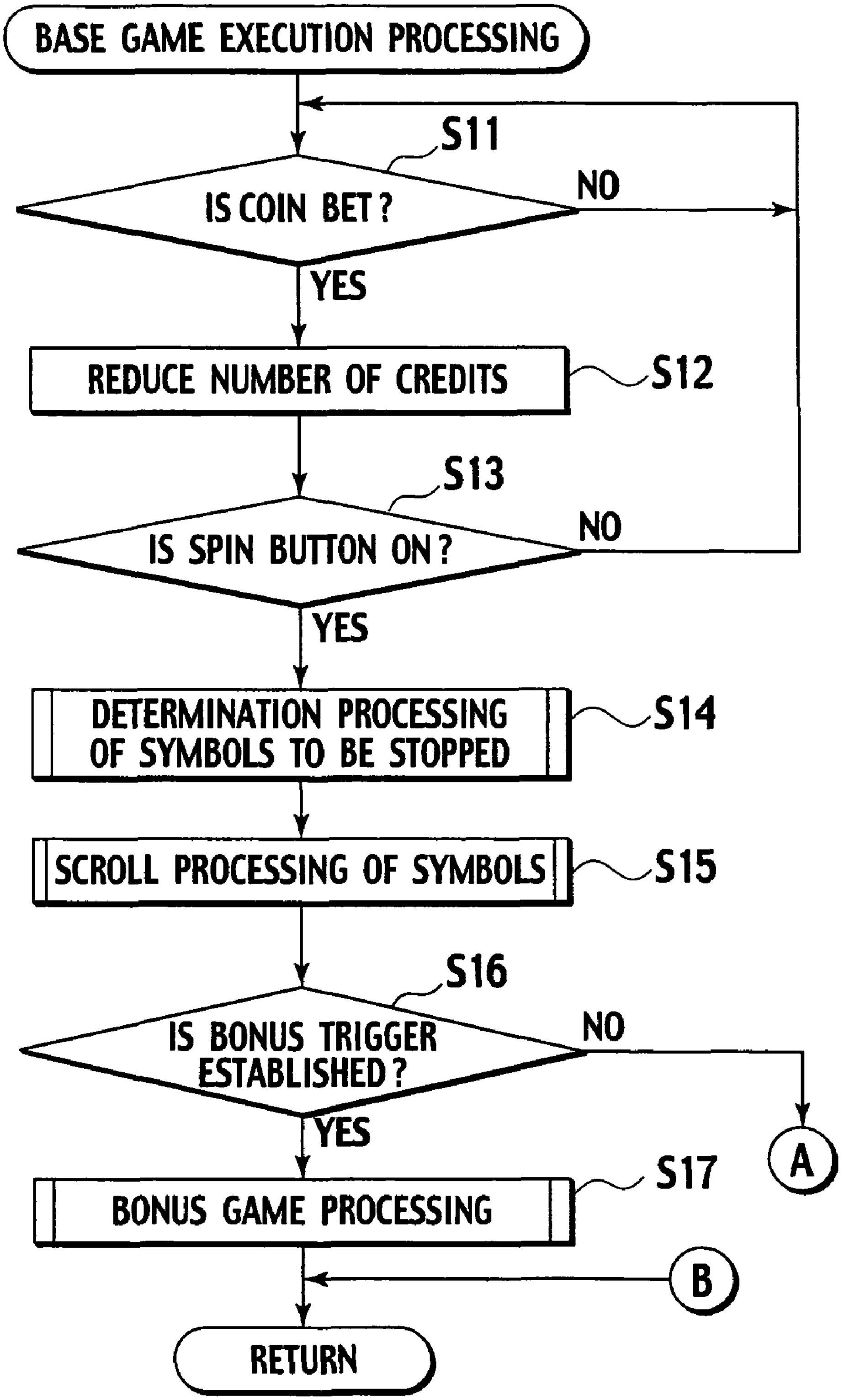
FIG. 8 is a flow chart showing a part of the processing procedure of the base game executed by the slot machine according to the first embodiment of the present invention.

FIG. 8 is a flow chart showing a specific processing procedure of the base game execution processing shown in step S200 in FIG. 1 and step S4 in FIG. 7.

In the base game execution processing, the main CPU 41 first determines whether or not a coin has been bet (step S11). In this processing, the main CPU 41 determines whether or not an input signal that is output from the 1-bet switch 26S when the 1-bet button 26 is pressed by the player, or an input signal that is output from the maximum bet switch 27S when the maximum bet button 27 is pressed by the player is received. When it is determined that no coin has been bet by the player, the processing returns to step S11.

On the other hand, when it is determined in step S11 that coins have been bet by the player, the main CPU 41 executes the processing to subtract the number of credits stored in the RAM 43 according to the number of coins bet (step S12). Here, if the number of coins bet is larger than that of credits stored in the RAM 43, the processing returns to step S11 without subtracting the number of credits stored in the RAM 43. In addition, if the number of coins bet exceeds an upper limit (50 in the present embodiment) that can be bet for a single game, the processing proceeds to step S13 without subtracting the number of credits stored in the RAM 43. In this state, the symbols can be scrolled on the display areas 28 (28*a* to 28*e*).

Next, the main CPU 41 determines whether or not the spin button 23 is turned on by the player (step S13). In this processing, when the spin button 23 is turned on by the player, the main CPU 41 determines whether or not an input signal that is output from the spin switch 23S is received.

When it is determined that the spin button 23 has not been turned on by the player, the processing returns to step S11. Here, the main CPU 41 cancels the subtraction result in step S12 when the spin button 23 is not turned on by the player (for example, a command to terminate the game has been input without the player turning on the spin button 23).

In the present embodiment, a case will be described in which the processing of subtracting the number of credits (step S12) is executed after the coins have been bet by the player (step S11) and before determining whether or not the spin button 23 has been turned on by the player (step S13). However, the present invention is not limited to this case. For example, whether or not the spin button 23 has been turned on by the player is determined (step S13) after the coins have been bet by the player (step S11), and the processing of subtracting the number of credits (step S12) may be executed when it is determined that the spin button 23 has been turned on by the player (YES in step S13).

Then, the main CPU 41 executes the processing of determining the symbols to be stopped (step S14) when it is determined that the spin button 23 has been turned on by the player in step S13 in FIG. 7. In this processing of determining the symbols to be stopped, the main CPU 41 determines, by executing the symbol-to-be-stopped determination program stored in the RAM 43, the symbols to be displayed through the display windows 15 when the symbols come to a stop on each of the display areas 28 (28*a* to 28*e*). This determines the combination of the symbols that will stop on the payline L.

Next, the main CPU 41 executes the processing of scrolling the symbols (step S15). This is the processing of stopping, after scrolling of the symbols on each of the display areas 28 (28*a* to 28*e*) has been started, the symbols on each of the display areas 28 (28*a* to 28*e*) so that the symbols determined in step S14 will stop on the payline L.

Figure 19A:
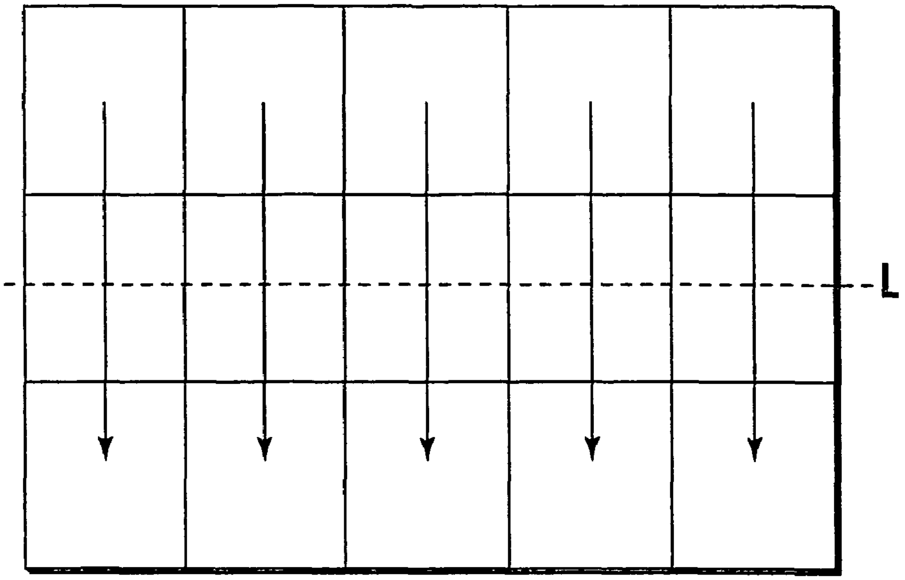
FIG. 19A is a diagram showing a display example when symbols are scrolling.
Figure 19B:
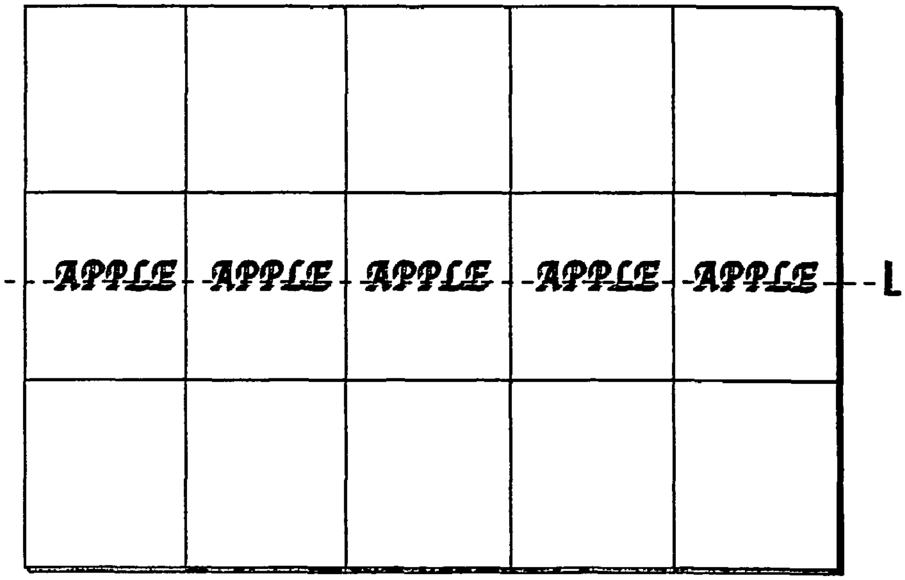
FIG. 19B is a diagram showing a display example when the winning combination of the symbols "APPLE" is rearranged on the payline.

Next, the main CPU 41 determines whether or not the bonus trigger has been established, that is, whether or not the combination, for example, as shown in FIG. 19B, of the symbols "APPLE" has come to a stop on the payline L (step S16) and when it is determined that the bonus trigger has been established, the bonus game processing to be described later is executed (step S17).

Figure 9:
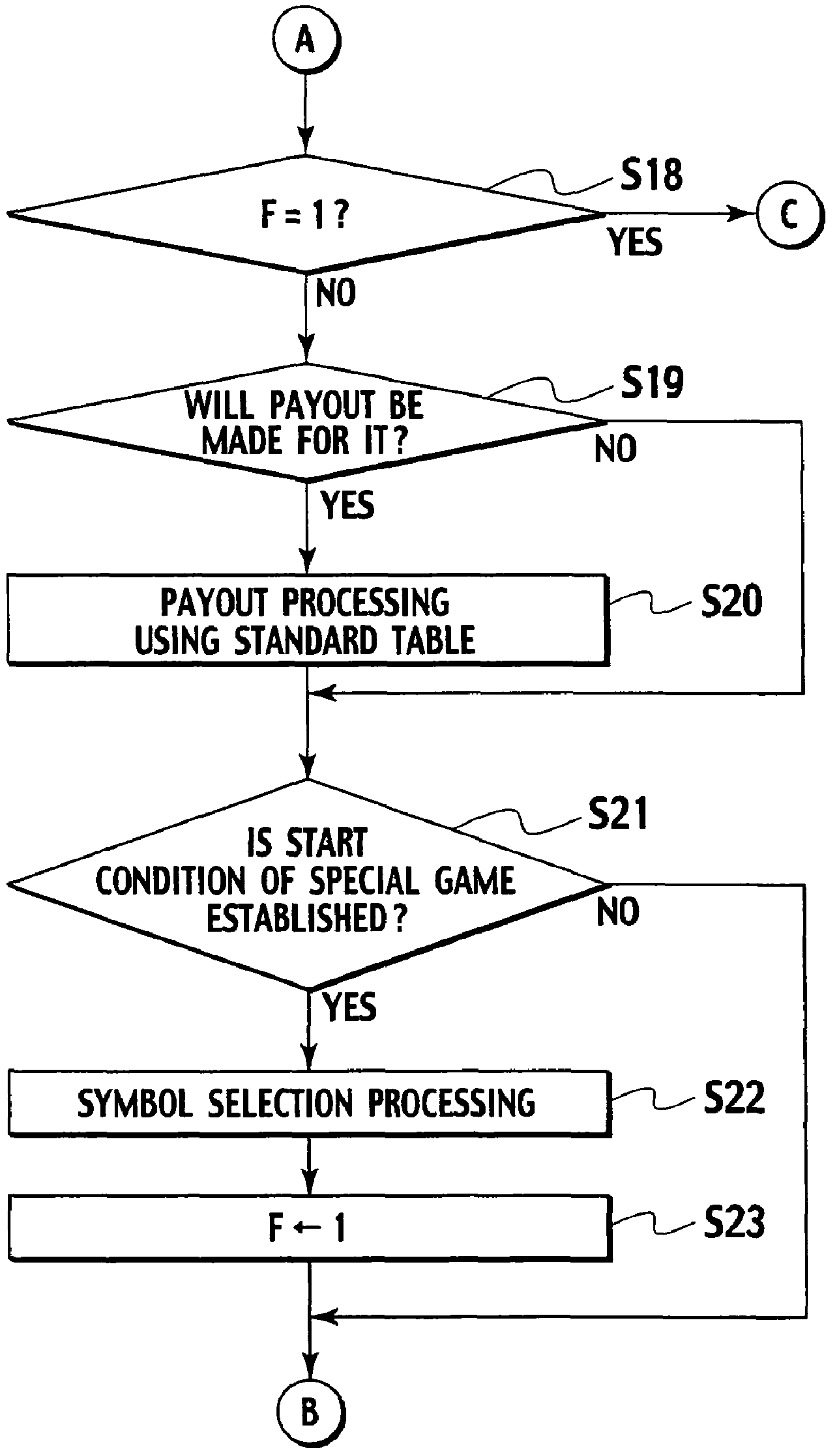
FIG. 9 is a flow chart showing another part of the processing procedure of the base game executed by the slot machine according to the first embodiment of the present invention.

When the bonus trigger has not been established, the main CPU 41 determines whether or not the flag of the RAM 43, which indicates whether or not the special game is being executed, is "1", indicating that the special game is being executed, as shown in the flow chart in FIG. 9 (step S18).

When the flag F is not "1", that is, the special game is not being executed (NO in step S18), the main CPU 41 determines whether or not the combination of symbols having stopped on each of the display areas 28 is a combination for which payout will be made (step S19).

Figure 19C:
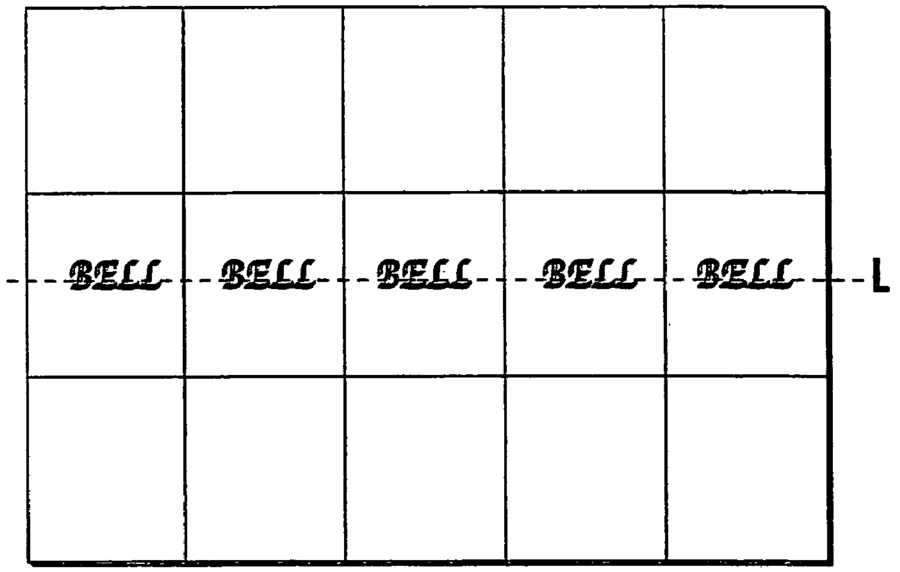
FIG. 19C is a diagram showing a display example when the winning combination of the symbols "BELL" is rearranged on the payline.
Figure 19D:
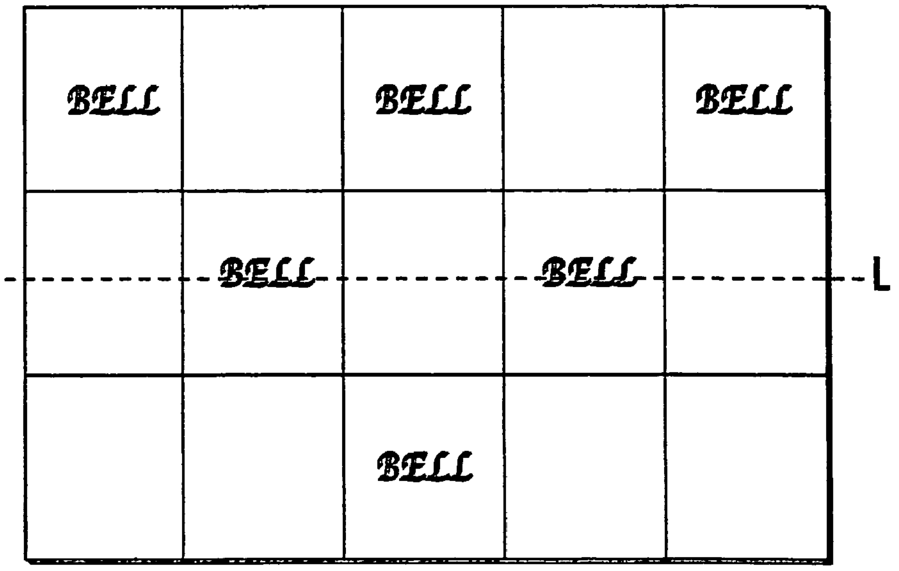
FIG. 19D is a diagram showing a display example when a combination including a predetermined number of symbols "BELL" is rearranged.

In addition, it is possible to recognize that the combination of symbols having stopped on each of the display areas 28 is a combination for which payout will be made by the combinations having stopped on each of the display areas 28, such as a combination of the symbols "BELL" alone or "PLUM" alone having stopped on the payline L, as shown in FIG. 19C or FIG. 18B, and a combination including a predetermined number (six, in FIG. 19D) of symbols "BELL", as shown in FIG. 19D.

Then, when the combination of the symbols having stopped on each of the display areas 28 is a combination for which payout will be made (YES in step S19), the payout processing is executed for the combination of the symbols having stopped on each of the display areas 28 by applying the payout rate (payout amount) defined in the standard payout table in FIG. 4A (step S20).

After this, the main CPU 41 determines whether or not the start condition of the special game has been established (step S21).

In addition, it is possible to determine that the start condition of the special game has been established by the way, for example, the random number value defined by a random number signal, which is generated by the main CPU 41 in accordance with the timing at which the spin button 23 is turned on by the player by executing a random number generation program included in the base game execution program, coincides with the random number programmed in advance.

Here, when the start condition of the special game has not been established (No in step S21), the main CPU 41 terminates the one time base game execution processing and shifts to the next base game execution processing, and when the start condition of the special game has been established (YES in step S21), the main CPU 41 executes the symbol selection processing (step S22).

Figure 20A:
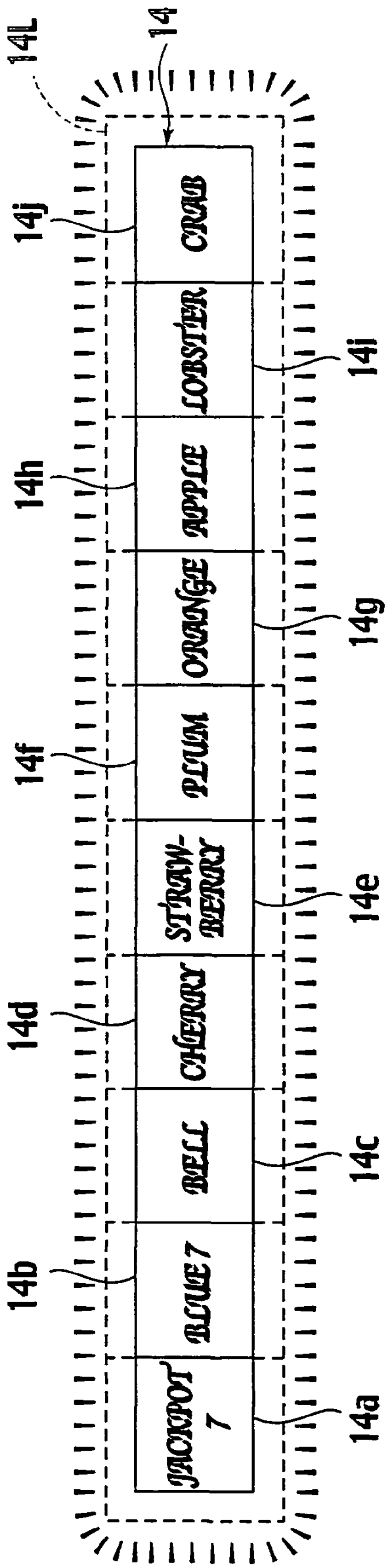
FIG. 20A is a diagram showing a display example of a symbol selecting display when a start condition of the special game has been established.

The symbol selection processing corresponds to the subgame explained in step S400 in FIG. 1. Then, in the symbol selection processing, the main CPU 41 first lights up all the parts of the backlight 14L to bring each of the symbol display areas 14*a* to 14*j* of the symbol selecting display 14 into the lit-up (active) state, as shown in FIG. 20A, and then, recognizes the symbol selected by the player by detecting the contact operation and the contact position of the touch screen 69 by the player.

Figure 20B:
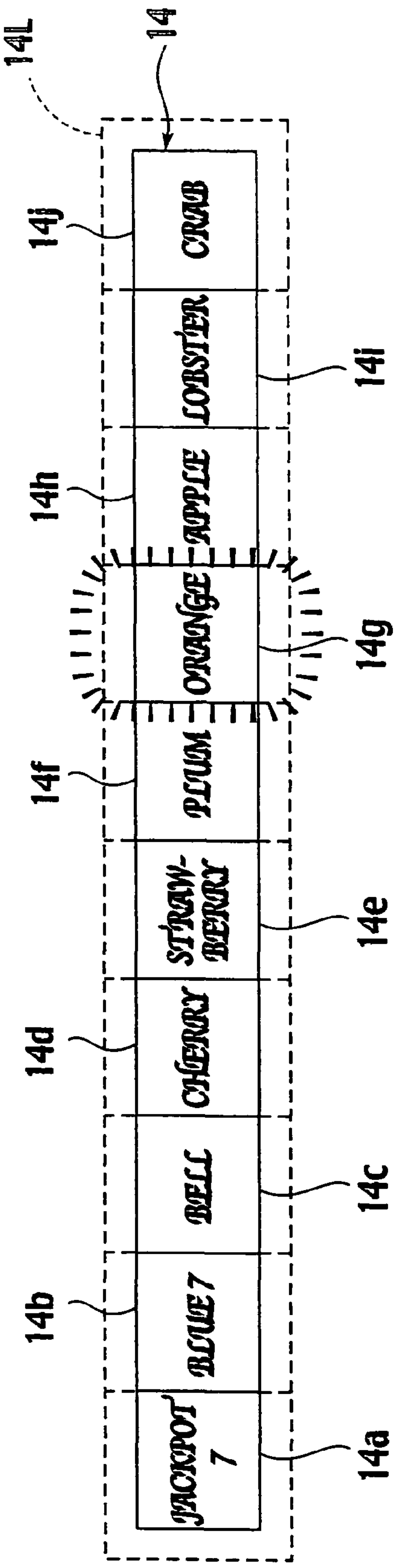
FIG. 20B is a diagram showing a display example of the symbol selecting display after a specific symbol is selected by the player.

Subsequently, as shown in FIG. 20B, the main CPU 41 turns off the parts of the backlight 14L other than the part corresponding to the symbol selected by the player and brings only the symbol display area 14*f* (or any one of the symbol display areas 14*a* to 14*j*) corresponding to the symbol selected by the player into the lit-up state.

By the way, in the following explanation of the present embodiment, it is assumed that the player selects the symbol "PLUM".

As described above, after recognizing a player-selected symbol "PLUM" and executing the lighting-up display of the symbol "PLUM" to light up only the part of the symbol display area 14*f* corresponding to the player-selected symbol "PLUM", the main CPU 41 sets the flag F of the RAM 43 to "1" indicating that the special game is being executed (step S23), and terminates a series of the base game execution processing and shifts to the next base game execution processing.

When the bonus trigger has not been established (NO in step S16 in FIG. 8) and the flag F of the RAM 43 is set to "1", that is, when the special game is being executed (YES in step S18), the main CPU 41 determines whether or not the combination of symbols having stopped on each of the display areas 28 is a combination for which payout will be made, as shown in the flow chart in FIG. 10 (step S24).

When the combination of symbols having stopped on each of the display areas 28 is not a combination for which payout will be made (NO in step S24), the main CPU 41 determines whether or not the player-selected symbol "PLUM" by the contact operation of the touch screen 69 is included in the combination of symbols having stopped on each of the display areas 28 (step S25).

Then, as shown in FIG. 18C, when the player-selected symbol "PLUM" is included in the combination of symbols having stopped on each of the display areas 28 (YES in step S25), the number of player-selected symbols "PLUM" (three, in the case of FIG. 18C) is added (accumulated) to the count value M of the counter of the number of stopped symbol of the RAM 43 (step S26).

On the other hand, when the special game is being executed (YES in step S18 in FIG. 9) and the combination of symbols having stopped on each of the display areas 28 is a combination for which payout will be made (YES in step S24), the main CPU 41 determines whether or not the combination having stopped on each of the display areas 28, for which payout will be made, consists of the player-selected symbols "PLUM" by the contact operation of the touch screen 69 (step S27).

When the combination having stopped on each of the display areas 28, for which payout will be made, is a combination of the symbols other than the player-selected symbol "PLUM", for example, such as a combination of the symbols "BELL", as shown in FIG. 19C (NO in step S27), the main CPU 41 executes the payout processing for the combination having stopped on each of the display areas 28 by applying the payout rate (payout amount) defined in the standard payout table in FIG. 4A (step S28).

On the other hand, when the combination having stopped on each of the display areas 28, for which payout will be made, is the combination of the player-selected symbols "PLUM" (YES in step S27), the main CPU 41 selects a payout table corresponding the count value M in the counter of the number of stopped symbols of the RAM 43 from among the payout tables for the special game in FIG. 4B to FIG. 4K and executes the payout processing for the combination of the symbols "PLUM" having stopped on each of the display areas 28 by applying the payout rate defined in the selected payout table for the special game (step S29).

By the way, the "combination of the player-selected symbols "PLUM"" described here may include the winning combination of the player-selected symbols "PLUM", having stopped on the payline L of the display areas 28, however, in the present embodiment, explanation will be given on the assumption that the combination includes a predetermined number (six, in FIG. 18A) of player-selected symbols "PLUM".

In addition, the payout table for the special game corresponding to the count value M of the counter of the number of stopped symbols of the RAM 43 may be set as follows, for example.

In other words, it is possible to set so that the payout table for the special game in FIG. 4B is applied when the count value M is 0 to 3, the payout table for the special game in FIG. 4C is applied when the count value M is 4 to 6, the payout table for the special game in FIG. 4D is applied when the count value M is 7 to 9, the payout table for the special game in FIG. 4E is applied when the count value M is 10 to 12, and the payout table for the special game in FIG. 4F is applied when the count value M is 13 to 15.

Further, it is possible to set so that the payout table for the special game in FIG. 4G is applied when the count value M is 16 to 18, the payout table for the special game in FIG. 4H is applied when the count value M is 19 to 21, the payout table for the special game in FIG. 4I is applied when the count value M is 22 to 25, the payout table for the special game in FIG. 4J is applied when the count value M is 26 to 28, and the payout table for the special game in FIG. 4K is applied when the count value M is equal to or greater than 29.

Then, when the special game is being executed (YES in step S18 in FIG. 9), irrespective of whether the combination of symbols having stopped on each of the display areas 28 is a combination for which payout will be made (YES in step S24) or not (NO in step S24), the main CPU 41 determines whether or not the count value N of the counter of execution times has reached a predetermined value (10, in the present embodiment), that is, whether or not the special game has been executed a predetermined number of times (10, in the present embodiment) (step S31) after incrementing the count value N of the counter of execution times of the RAM 43, which indicates the number of execution times of the special game, by "one" (step S30).

When the count value N of the counter of the number of execution times has reached 10 (YES in step S31), the main CPU 41 determines, on the assumption that the number of execution times of the special game has reached 10, whether or not payout for the combination of the player-selected specific symbols has occurred during the 10 special games (step S32), and if payout has never occurred (NO in step S32), the main CPU 41 executes the payout processing of guaranteed minimum number of coins of the special game, which is defined in the payout table for the special game corresponding to the count value M of the counter of the number of stopped symbols of the RAM 43 to be applied here, out of the payout tables for the special game in FIG. 4B to FIG. 4K (step S33).

Figure 20C:
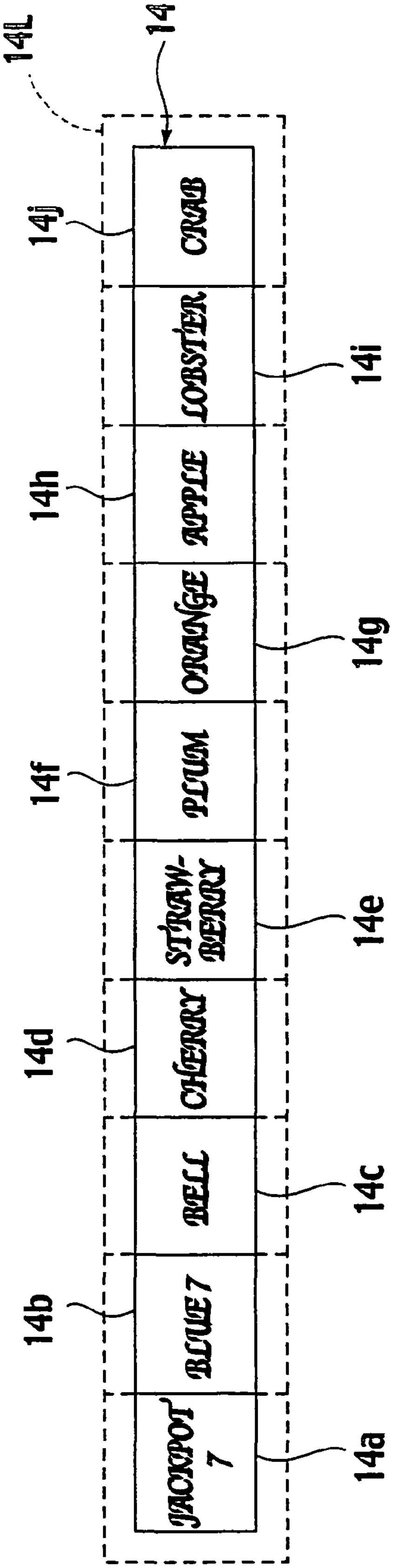
FIG. 20C is a diagram showing a display example of the symbol selecting display when the special game terminates.

Then, the main CPU 41 sets the flag F of the RAM 43 to "0" indicating that the special game is not being executed and at the same time, resets to zero the count value M of the counter of the number of stopped symbols of the RAM 43 and the count value N of the counter of the number of execution times, and as shown in FIG. 20C, turns off all the parts of the backlight 14L to bring each of the symbol display areas 14*a* to 14*j* of the symbol selecting display 14 into the unlit (inactive) state (step S34), and terminates the special game being executed along with the base game and shifts to the execution processing of the base game alone.

In this manner, the base game and the special game are executed.

By the way, when saving the coins to be paid out, the main CPU 41 adds a predetermined number of credits to the number of credits stored in the RAM 43. In addition, when paying out coins, the main CPU 41 transmits a control signal to the hopper 66 to pay out a predetermined number of coins. At this time, the coin detecting unit 67 counts the number of coins to be paid out from the hopper 66, and transmits a payout completion signal to the main CPU 41 when the counted value reaches a specified number. Due to this, the main CPU 41 stops the drive of the hopper 66 and terminates the coin payout processing.

Therefore, with the slot machine 10 in the present embodiment, after the start condition of the special game is established and a specific symbol (for example, "PLUM") is selected by the player, and while the special game up to 10 times is being executed along with the base game, with the increasing number of specific symbols rearranged on the display areas 28, the payout rate (payout amount) when a combination of symbols, for which payout will be made, is rearranged on the display areas 28 increases as 3, 6, 12, 24, 48, 96, 192, 384, 768, and 1,536.

Next, processing for determining symbols to be stopped that is shown in step S14 in FIG. 8 will be described with reference to the flow chart shown in FIG. 12.

Figure 12:
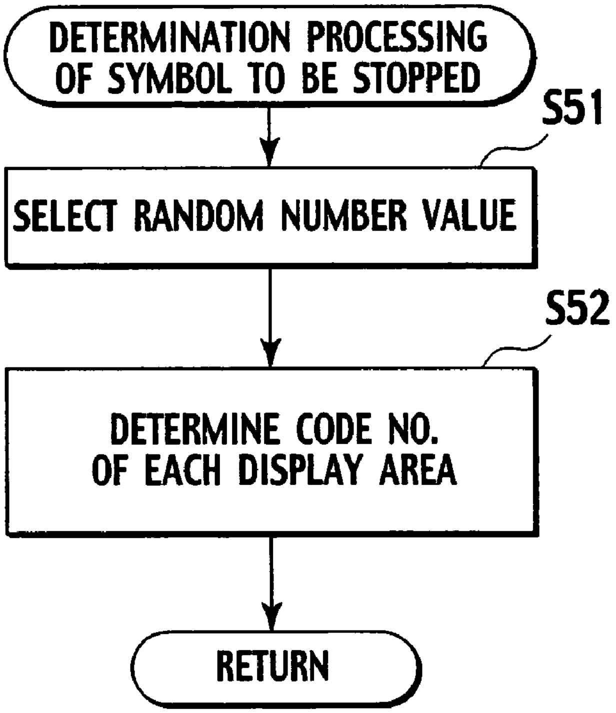
FIG. 12 is a flow chart showing the procedure of symbol-to-be-stopped determination processing executed by the slot machine according to the first embodiment and the second embodiment of the present invention.

FIG. 12 is a flow chart showing the procedure of processing of determining symbols to be stopped, which is shown in step S14 in FIG. 8. The processing is one executed when the main CPU 41 executes the symbol-to-be-stopped determination program stored in the RAM 43.

First, the main CPU 41 selects random number values corresponding to each of the columns of the display areas 28 (28*a* to 28*e*) within a numeral range of 0 to 255 by executing a random number generation program included in the symbol-to-be-stopped determination program (step S51).

Next, the main CPU 41 refers to symbol weighting data in accordance with the payout rate setting data that is output from the GAL 54 and stored in the RAM 43, and determines, based on the five selected random number values, code numbers (refer to FIG. 3) for each of the display areas 28 (28*a* to 28*e*) (step S52).

The code number for each of the display areas 28 (28*a* to 28*e*) corresponds to the code number of the symbol to be stopped and displayed on the payline L. The main CPU 41 determines a winning combination by determining the code number for each of the display areas 28. For example, when the code numbers for each of the display areas 28 (28*a* to 28*e*) are determined as "00", "00", "00", "00", and "00", respectively, it follows that the main CPU 41 has determined the winning combination as "JACKPOT 7".

Figure 13:
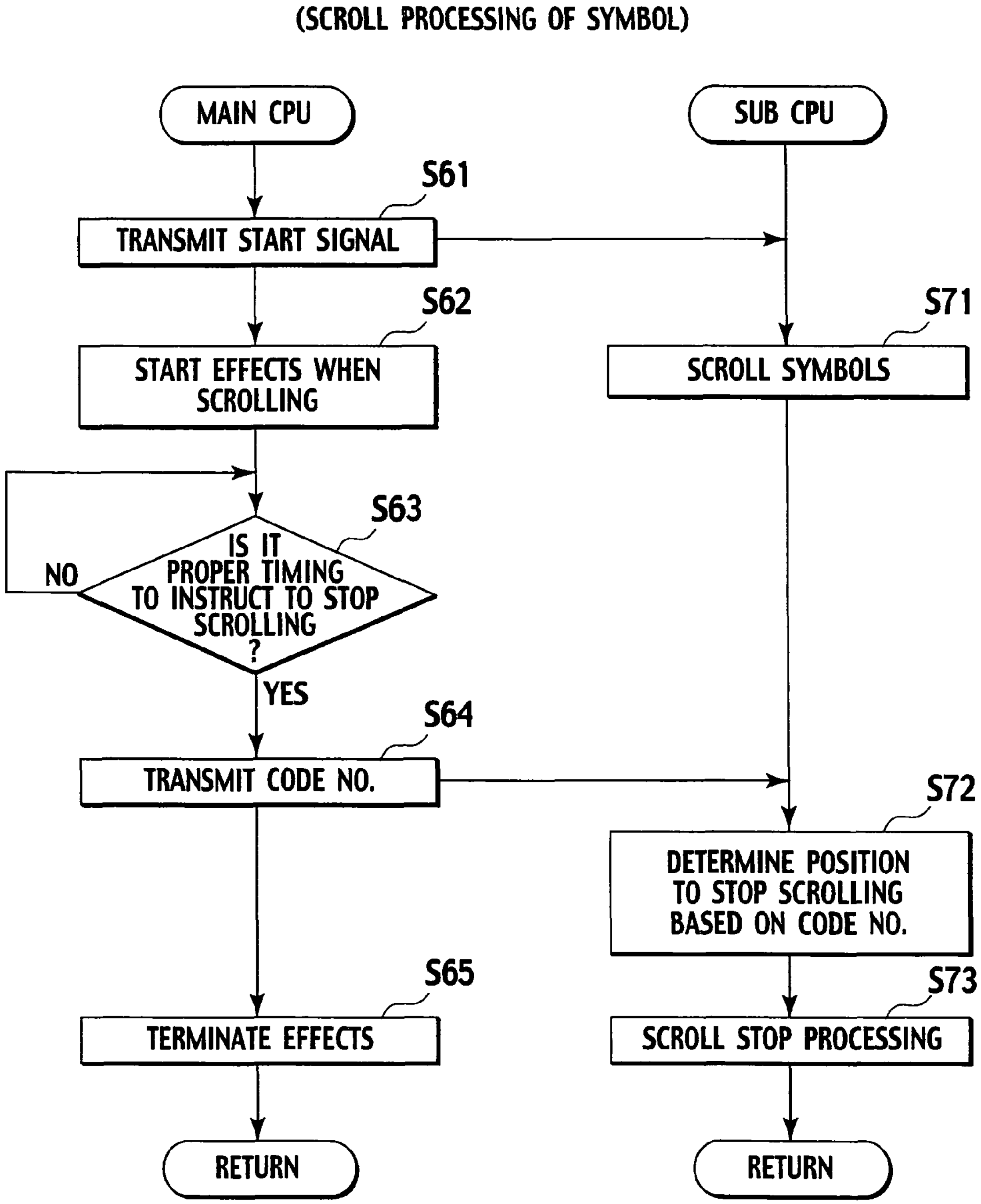
FIG. 13 is a flow chart showing the procedure of symbol scroll processing executed by the slot machine according to the first embodiment and the second embodiment of the present invention.

FIG. 13 is a flow chart showing the processing of scrolling the symbols shown in step S15 in FIG. 8. Here, the processing is one executed between the main CPU 41 and the sub CPU 61.

First, the main CPU 41 transmits, to the sub CPU 61, a start signal to start scrolling of symbols on the display areas 28 of the liquid crystal display 17 (step S61). Upon receipt of the start signal from the main CPU 41, the sub CPU 61 outputs, to the VDP 46, a scroll command of the symbols and the VDP 46 reads image data of the symbols stored in the image data ROM 47, and scrolls the symbols on the 3-column display areas 28 (28*a* to 28*e*) of the liquid crystal display 17 (step S71). Due to this, scrolling of the symbols is started on each of the 5-column display areas 28 (28*a* to 28*e*).

After having transmitted the start signal to the sub CPU 61 in step S61 shown in FIG. 13, the main CPU 41 provides effects while the symbols are being scrolled (step S62). The processing is one displaying images on the lower display panel 16 and/or outputting sound from the loudspeaker 29 for a period of time (for example, three seconds) defined in accordance with the result of determination processing of the symbols to be stopped (step S14 in FIG. 8).

Next, the main CPU 41 determines whether or not it is a proper timing to instruct to stop the scrolling (step S63 in FIG. 13).

When, in the processing in step S63, it is determined that it is not a proper timing to instruct to stop the scrolling, the processing returns to step S63 and continues to provide effects during the scrolling. Alternatively, when, in the processing in step S63, it is determined that it is a proper timing to instruct to stop the scrolling, the main CPU 41 transmits the code number of the symbol stored in the RAM 43 to the sub CPU 61 (step S64). Upon receipt of the code number of the symbol from the main CPU 41, the sub CPU 61 determines the position to stop the scrolling in accordance with the code number (step S72).

Subsequently, processing of stopping the scrolling is executed, whereby the symbols are stopped and displayed (step S73) on each of the display areas 28 (28*a* to 28*c*) inside each of the display windows 15 (15*a* to 15*e*). In addition, the processing of displaying effect images by the main CPU 41 terminates (step S65).

Figure 14:
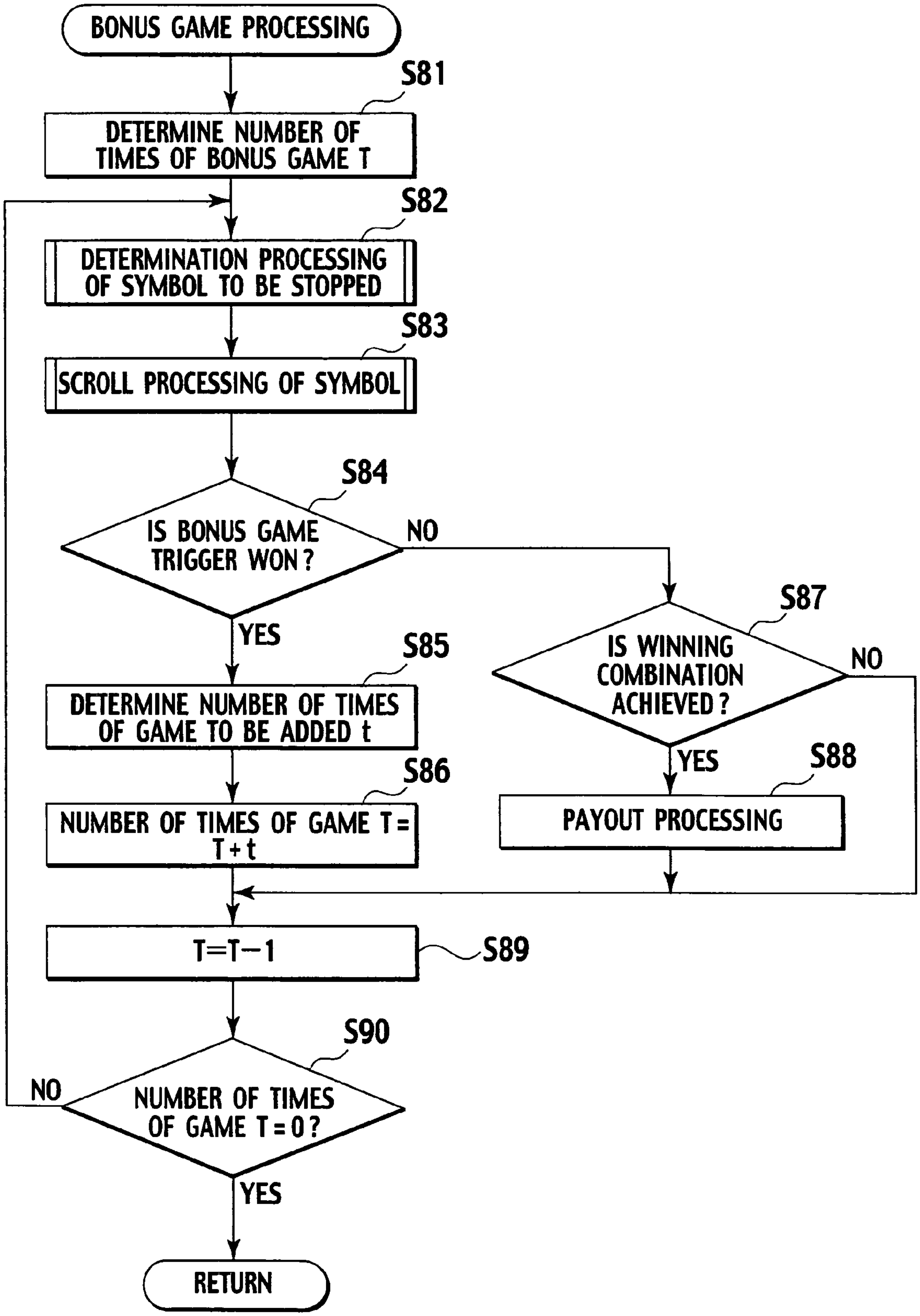
FIG. 14 is a flow chart showing the processing procedure of a bonus game executed by the slot machine according to the first embodiment and the second embodiment of the present invention.

FIG. 14 is a flow chart showing the bonus game processing shown in step S17 in FIG. 8. In the bonus game processing, the main CPU 41 first determines, based on a random number value obtained by executing the random number generation program included in the symbol-to-be-stopped determination program stored in the RAM 43, the number of execution times T of the bonus game out of 10 to 25 games (step S81). The main CPU 41 stores data of the determined number of games T of the bonus game in RAM 43.

Next, the main CPU 41 executes processing of determining the symbols to be stopped (step S82) and processing of scrolling the symbols (step S83). The processing in step S82 is substantially the same as that explained using FIG. 12. Likewise, the processing in step S83 is substantially the same as that explained using FIG. 13. Since the processing described above has already been described, duplicate description will be omitted here.

Next, as shown in FIG. 14, the main CPU 41 determines whether or not the bonus game trigger has been established, that is, whether or not the combination of the "APPLE" has come to a stop on the payline L formed on the display areas 28 (28*a* to 28*c*) inside the display windows 15 (step S84). When it is determined that the bonus game trigger has been established (YES in step S84), the number of repetition times t of the bonus game is newly determined (step S85) and the determined number of repetition times t is added to the game number T of the current bonus game (step S86). Due to this, the remaining number of times of the bonus game increases if the bonus game is won again during execution of the bonus game.

When the bonus game trigger has not been established, the main CPU 41 determines whether or not a combination for which payout will be made has stopped on each of the display areas 28 (step S87).

It is possible to determine that a combination for which payout will be made by the way that the winning combination of the "BELL", "CHERRY", or "PLUM", which is defined in the standard payout table in FIG. 4A, has been achieved on the payline L, or a combination including a predetermined number (for example, six) or more of symbols "BELL" has stopped on each of the display areas 28.

When it is determined that a combination for which payout will be made has stopped on each of the display areas 28 (YES in step S87), the main CPU 41 executes payout of coins according to the number of coins inserted and the winning combination (step S88). At this time, payout is made based on the standard payout table shown in FIG. 4A.

When the processing in step S86 or S88 is executed, or when it is determined in step S87 that none of the combinations for which payout will be made has stopped on each of the display areas 28 (determined to be losing), the main CPU 41 reads out the game number T of the bonus game stored in the RAM 43 and subtracts "one" from the value of the read-out game number T. Then, the subtracted game number T is stored in the RAM 43 again (step S89).

Subsequently, the main CPU 41 determines whether or not the game number T of the bonus game has reached the number of times determined in step S81 (step S90). Specifically, the determination is made based on whether or not the game number T stored in the RAM 43 has become zero. When the game number T is not zero, in other words, when it is determined that the number of execution times of the bonus game has not reached the number of times determined in step S81, the processing returns to step S82 and the above processing is repeated.

On the other hand, when the game number T is zero, in other words, when it is determined that the number of execution times of the bonus game has reached the number of times determined in step S81, the processing is terminated. The bonus game is executed in this manner.

As described above, with the slot machine 10 in the first embodiment, when the special game is started, with the increasing number of rearranged specific symbols (for example, "PLUM") selected by the player during the special game executed 10 times, the payout amount of credits increases when a combination occurs that establishes an award accompanied by the payout due to the specific symbols.

Because of this, according to the slot machine 10 in the first embodiment, when the special game is started, it is possible to further develop the player's interest in the game by causing the player to expect to receive payout of a large amount of credits when a combination occurs, which establishes an award accompanied by the payout of credits due to the specific symbol, depending on the number of rearranged specific symbols selected by the player.

Incidentally, in the first embodiment, a case where the special game is executed 10 times is explained. However, a configuration is also possible, in which, when a combination for which payout will be made due to a specific symbol selected by the player stops on each of the display areas 28 during the special game, and the payout processing is executed by applying the payout rate of a payout table selected out of the payout tables for the special game in FIG. 4B to FIG. 4K, it is possible to terminate the special game even if it is not executed 10 times and shift to the base game alone.

A modification example of the base game execution processing based on the above contents will be explained below with reference to FIG. 15.

Figure 15:
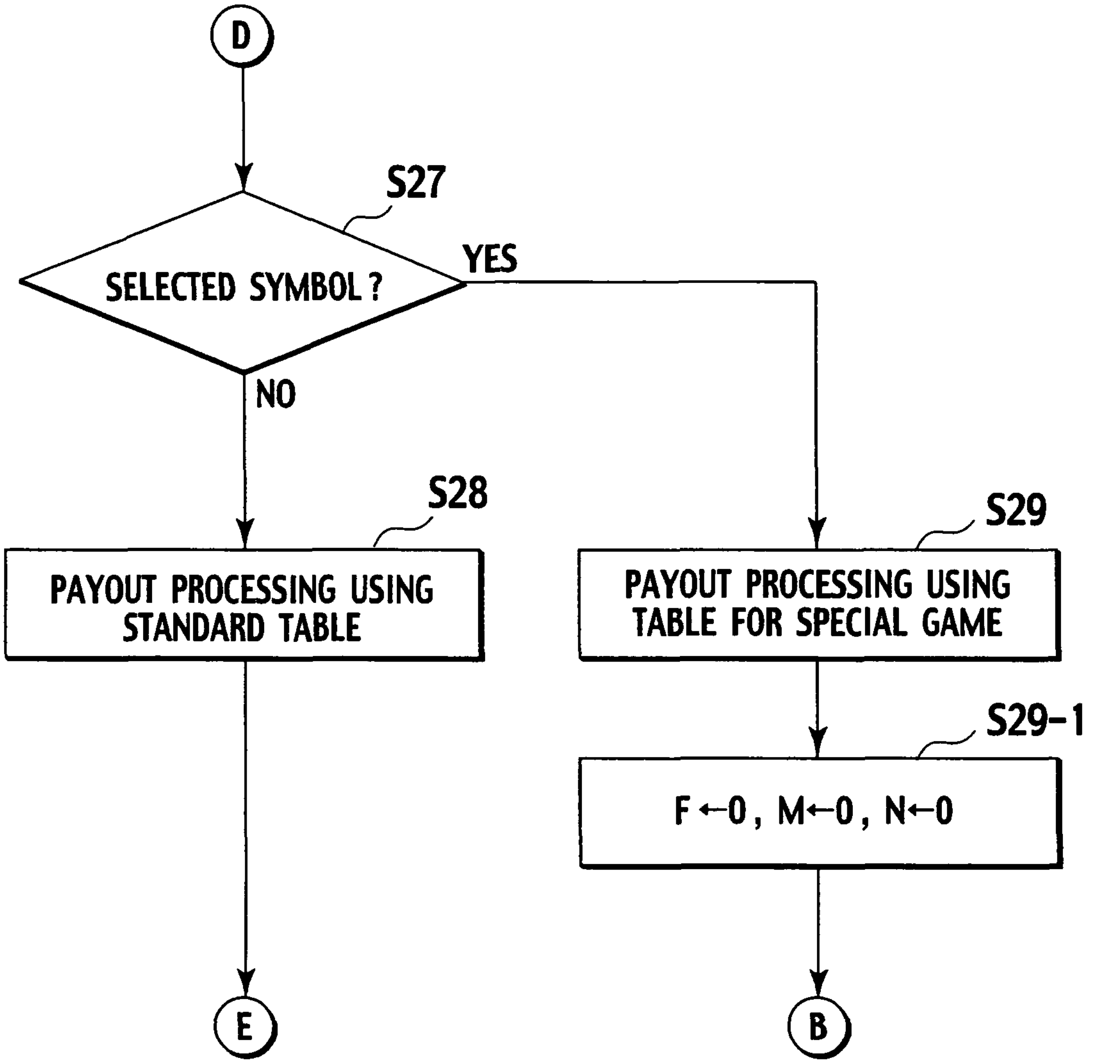
FIG. 15 is a flow chart showing a part of the processing procedure according to a modification example of the base game executed by the slot machine according to the first embodiment of the present invention.

FIG. 15 is a flow chart showing a part of the processing procedure according to a modification example of the base game executed by the slot machine 10 according to the first embodiment of the present invention.

Figure 11:
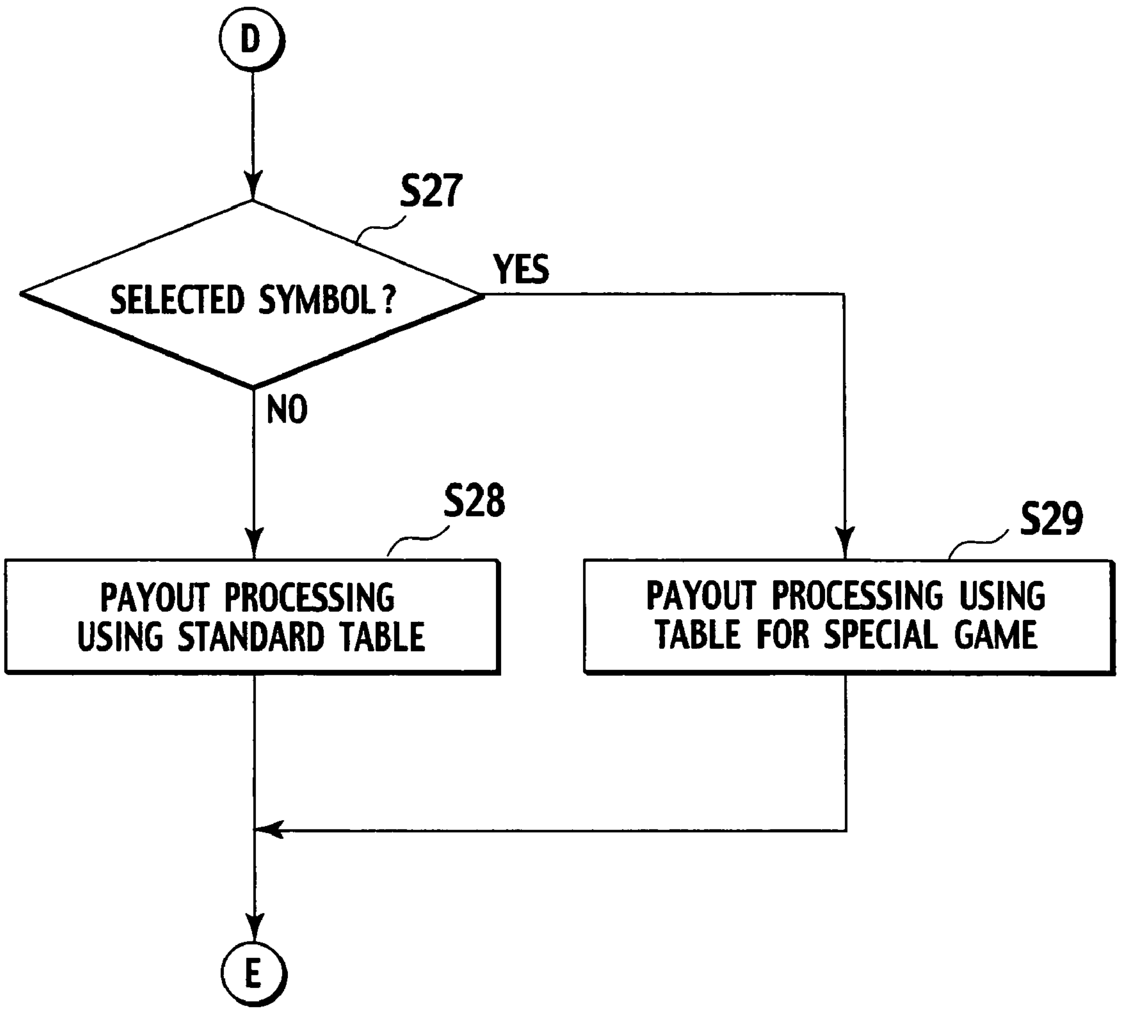
FIG. 11 is a flow chart showing another part of the processing procedure of the base game executed by the slot machine according to the first embodiment of the present invention.

In the base game execution processing according to the modification example, in step S29 shown in FIG. 11, the main CPU 41 selects a payout table corresponding to the count value M of the counter of the number of stopped symbols of the RAM 43 out of the payout tables for the special game in FIG. 4B to FIG. 4K and executes the payout processing for the combination of the symbols "PLUM" having stopped on each of the display areas 28 by applying the payout rate defined in the selected payout table for the special game, and then executes the following processing.

Figure 10:
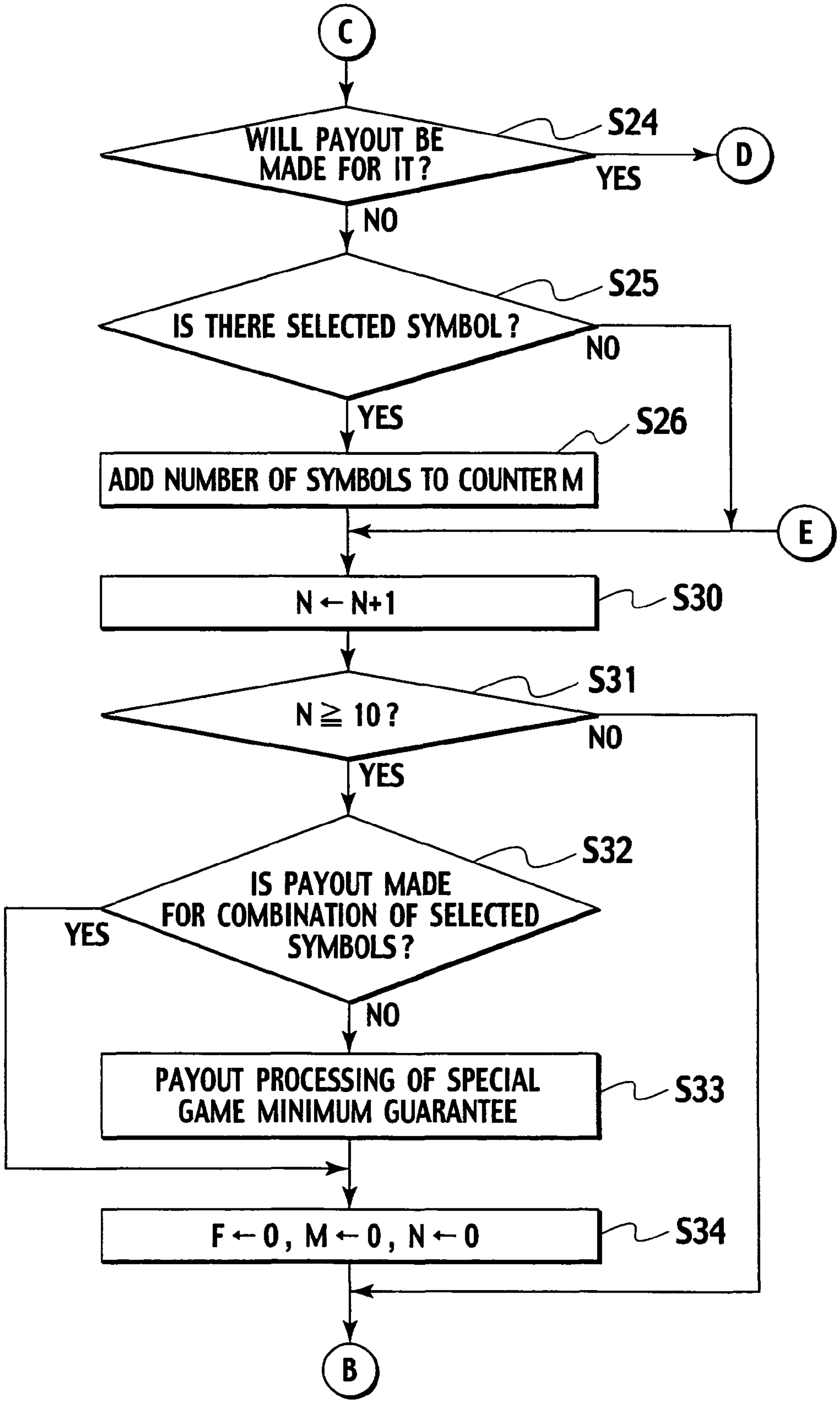
FIG. 10 is a flow chart showing another part of the processing procedure of the base game executed by the slot machine according to the first embodiment of the present invention.

In other words, as in step 34 shown in FIG. 10, the main CPU 41 sets the flag F of the RAM 43 to "0" indicating that the special game is not being executed and at the same time, resets to zero the count value M of the counter of the number of stopped symbols of the RAM 43 and the count value N of the counter of the number of execution times and turns off all the parts of the backlight 14L to bring each of the symbol display areas 14*a* to 14*j* of the symbol selecting display 14 into the unlit (inactive) state, as shown in FIG. 20C, and terminates the special game being executed along with the base game and shifts to the execution processing of the base game alone.

With the slot machine 10 of the present invention, which executes the modification example of the base game described above, when payout that never occurs in the base game alone occurs during the special game, it is regarded that the object of the execution of the special game is achieved and the special game immediately shifts to the base game alone as a result.

Also with the slot machine 10 according to the modification example of the first embodiment as described above, as with the slot machine 10 in the first embodiment, when the special game is started, it is possible to further develop the player's interest in the game by causing the player to expect to receive payout of a large amount of credits when a combination occurs, which establishes an award accompanied by the payout of credits due to the specific symbol, depending on the number of rearranged specific symbols selected by the player.

For the slot machine 10 according to the first embodiment and its modification example as described above respectively, a case where the special game and the base game are executed simultaneously, however, the present invention can also be applied to a case where the base game is aborted and the special game is executed as a second game.

A slot machine according to a second embodiment of the present invention will be explained below.

The slot machine according to the second embodiment has fundamentally the same hardware configuration as that of the slot machine in the first embodiment. Consequently, the explanation that has been given with reference to FIG. 2, FIG. 3, and FIG. 5 assigned with symbols will be quoted as the explanation of the fundamental configuration about the appearance and inside of the slot machine, and the duplicated explanation is omitted.

The contents of the slot machine 10 according to the second embodiment differ from those of the slot machine 10 according to the first embodiment in a part of the processing executed mainly by the main CPU 41.

In relation to this, in the slot machine 10 according to the second embodiment, the flag F is not provided in the RAM 43 of the mother board 40, which indicates whether or not the special game is being executed, and instead of the counter of the number of stopped symbols that indicates the number of stopped specific symbols selected by the player during the special game, a counter of the number of stopped combinations is provided, which indicates the number of times a combination including a predetermined number (for example, six) of specific symbols selected by the player stops on each of the display areas 28 during the special game.

Consequently, it follows that the main CPU 41 of the slot machine 10 in the second embodiment resets to zero a count value S of the counter of stopped combinations of the RAM 43 and resets to zero the count value N of the counter of execution times of the RAM 43, which indicates the number of execution times of the special game, in the initial setting in step S3 in the flow chart in FIG. 7.

In addition, with the slot machine 10 according to the second embodiment, instead of the standard payout table in FIG. 4A set to the slot machine 10 in the first embodiment, a standard payout table shown in FIG. 4L is applied during the base game. The standard payout table shown in FIG. 4L is selected during the period of execution of the base game and a payout table for the special game to be described below is selected during the special game.

The standard payout table in FIG. 4L set to the slot machine 10 in the second embodiment differs from that in FIG. 4A set to the slot machine 10 in the first embodiment, and it is set so that the case where the six symbols of the "BELL" stop in the five display areas 28 (28*a* to 28*e*) will be the start trigger of the special game.

Consequently, with the slot machine 10 in the second embodiment, when the six symbols of the "BELL" stop in the five display areas 28 (28*a* to 28*e*), the gaming state shifts from the base game to the special game as a second game.

Further, with the slot machine 10 according to the second embodiment, instead of the payout tables for the special game in FIG. 4B to FIG. 4K set to the slot machine 10 in the first embodiment, payout tables for the special game shown in FIG. 4M to FIG. 4W are applied during the period of execution of the special game. The payout tables for the special game are selected during the period of execution of the special game and not selected during the period of execution of the base game.

Then, during the special game, one payout table corresponding to the circumstances at that time is selected out of the payout tables for the special game in FIG. 4M to FIG. 4W and applied to payout.

The contents of the payout table for the special game shown in FIG. 4M are those in which the rate to pay out two coins, which is the guaranteed minimum number of coins, for the special game when the special game is terminated is added to the standard payout table in FIG. 4L selected during the period of execution of the base game.

On the other hand, the contents of the payout table for the special game shown in FIG. 4N are those in which the rate of the payout of coins for the special game when the special game is terminated in the payout table for the special game in FIG. 4M is modified so that the guaranteed minimum number of coins is modified from two to three.

Further, the contents of the payout tables for the special game shown respectively in FIG. 40 to FIG. 4W are those in which the rate of the payout of coins to be paid for the special game when the special game is terminated in the payout table for the special game in FIG. 4N is modified from three to those (6, 12, 24, 48, 96, 192, 384, 768, 1,536), which are three multiplied by powers of "two" sequentially.

By the way, the modified contents of the payout rate of coins to be paid out for the special game when the special game is terminated in the payout tables respectively shown in FIG. 40 to FIG. 4W may be those in which the number of coins increases as, for example, twice three (6), three times three (9), four times three (12), . . . , 10 times three (30), which are integer multiples of three, or those in which the number of coins increases in a pattern irrespective of integer multiples of three, as long as the number of coins sequentially increases for the payout rate in the payout table for the special game in FIG. 4N.

The processing procedure of the base game and the special game executed by the slot machine 10 in the second embodiment is explained below with reference to the flow chart in FIG. 16 and FIG. 17.

Figure 16:
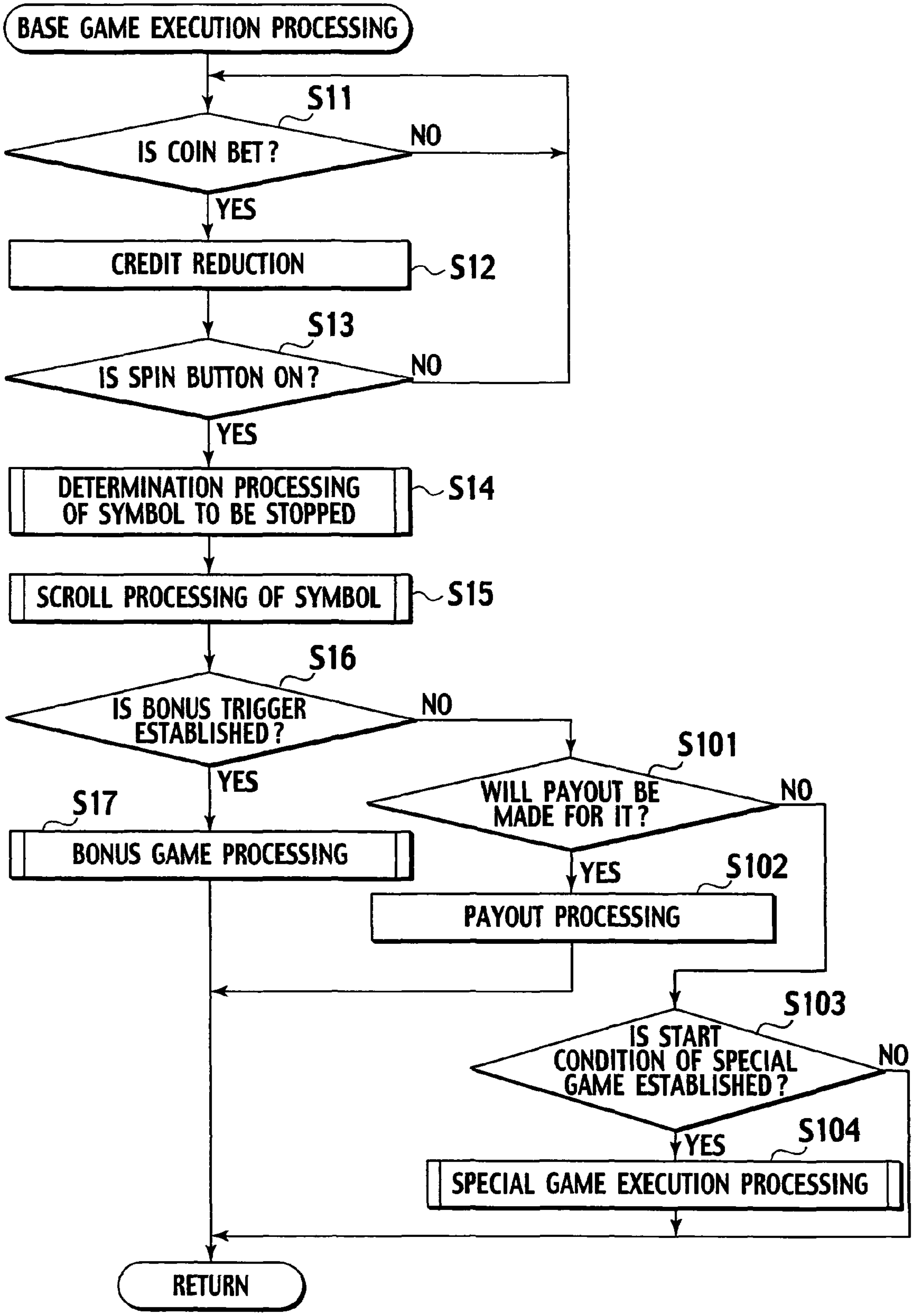
FIG. 16 is a flow chart showing the processing procedure of the base game executed by the slot machine according to the second embodiment of the present invention.

FIG. 16 is the flow chart showing the execution processing of the base game executed by the slot machine 10 according to the second embodiment of the present invention.

In the slot machine 10 in the present embodiment, the main CPU 41 executes from the determination as to whether or not coins have been bet (step S11) to the determination as to whether or not the bonus trigger has been established (step S16) by the same processing procedure as that executed by the main CPU 41 in the slot machine 10 in the first embodiment shown in FIG. 8.

Then, when it is determined that the bonus trigger has been established, the main CPU 41 executes the bonus game processing to be described later (step S17), and determines whether or not a combination for which payout will be made has stopped on the display areas 28 when the bonus trigger has not been established (step S101).

By the way, that the combination of symbols having stopped on each of the display areas 28 is a combination for which payout will be made can be recognized by the way the combination, for example, as shown in FIG. 19C or FIG. 18B, in which all the symbols that have stopped on the payline L are the "BELL" or "PLUM", has stopped on each of the display areas 28.

Then, when the combination of symbols having stopped on each of the display areas 28 is a combination for which payout will be made (YES in step S101), the payout rate (payout amount) defined in the standard payout table in FIG. 4L is applied and the payout processing for the combination of symbols having stopped on each of the display areas 28 is executed (step S102).

On the other hand, when the combination of symbols having stopped on each of the display areas 28 is not a combination for which payout will be made (NO in step S101), that is, when the combination is a losing one, the main CPU 41 determines whether or not the start condition of the special game has been established (step S103).

By the way, it is possible to determine that the start condition of the special game has been established in the slot machine 10 in the second embodiment in the same manner as that in the slot machine 10 in the first embodiment as follows; the main CPU 41 generates a random number signal in accordance with the timing at which the spin button is turned on by the player by executing the random number generation program included in the base game execution program, and when the random number value defined by the random number signal coincides with the random number programmed in advance as a winning number, it is determined that the start condition has been established.

Further, it is also possible to determine that the start condition of the special game has been established in the slot machine 10 in the second embodiment by an event that differs from that of the slot machine 10 in the first embodiment, in which a combination including a predetermined number (six, in FIG. 19D) of symbols "BELL", for example, as shown in FIG. 19D, has stopped on each of the display areas 28.

In such a case, as the standard payout table to be applied during the execution of the base game, a standard payout table as shown in FIG. 4Y, in which a combination including a predetermined number (for example, six) of symbols "BELL" is defined as the start trigger of the special game in the definition contents of the standard payout table shown in FIG. 4L, is used as a result instead of the standard payout table shown in FIG. 4L.

Here, when the start condition of the special game has not been established (NO in step S103), the main CPU 41 terminates the one-time base game execution processing and shifts to the next base game execution processing, and when the start condition of the special game has been established (YES in step S103), shifting to the next base game execution processing after executing the special game execution processing (step S104).

Figure 17:
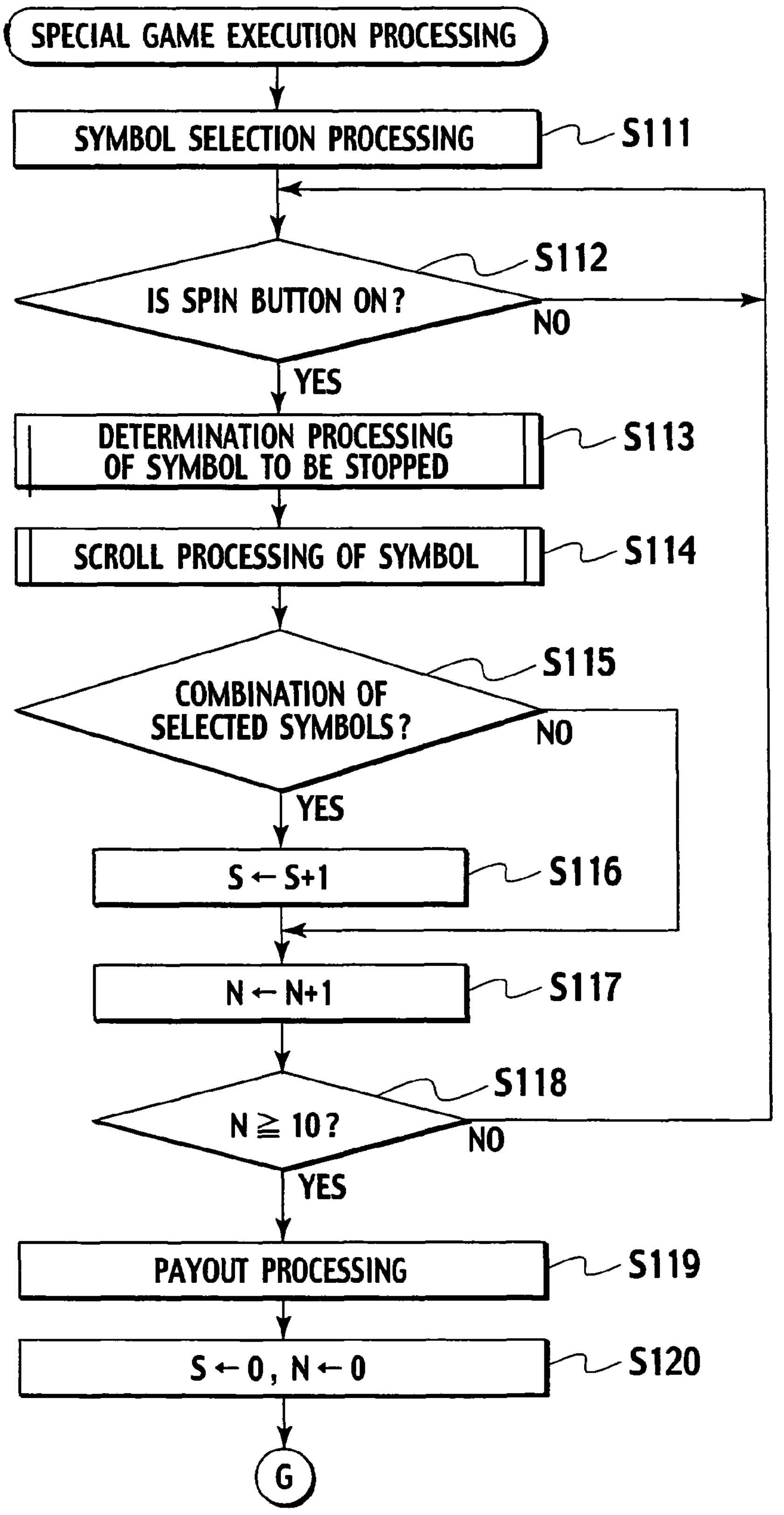
FIG. 17 is a flow chart showing the processing procedure of the special game executed by the slot machine according to the second embodiment of the present invention.

FIG. 17 is a flow chart showing the special game execution processing shown in step S104 in FIG. 16. In the special game execution processing, first, the main CPU 41 executes the symbol selection processing (step S111).

In the symbol selection processing, as in the slot machine 10 in the first embodiment, the main CPU 41 first lights up all the parts of the backlight 14L to bring each of the symbol display areas 14*a* to 14*j* of the symbol selecting display 14 into the lit-up (active) state, as shown in FIG. 20A, and then, recognizes the player-selected symbol by detecting the contact operation and the contact position of the touch screen 69 by the player.

Subsequently, as shown in FIG. 20B, the main CPU 41 turns off the parts of the backlight 14L other than the part corresponding to the player-selected symbol and brings only the symbol display area 14*f* (or any one of the symbol display areas 14*a* to 14*j*) corresponding to the player-selected symbol into the lit-up state.

By the way, in the following explanation of the present embodiment, it is assumed that the player selects the symbol "PLUM".

After recognizing the player-selected symbol "PLUM" in this manner and executing the lighting-up display of the symbol "PLUM" by the lighting-up of only the part of the symbol display area 14*f* of the backlight 14L, corresponding to the player-selected symbol "PLUM", the main CPU 41 stands by for the turning on of the spin button 23 by the player (step S112).

Then, when determining that the spin button 23 has been turned on by the player, the main CPU 41 executes the symbol-to-be-stopped determination processing (step S113) and the scroll processing of the symbols (step S114). The processing in step S113 is substantially the same processing as that explained using FIG. 12. Further, the processing in step S114 is substantially the same processing as the processing explained using FIG. 13. The processing described above is already explained and therefore the explanation thereof is omitted here.

Next, in FIG. 17, the main CPU 41 determines whether or not a combination including a predetermined number (six in FIG. 18A) of symbols "PLUM" selected by the player has stopped on each of the display areas 28 (step S115) and when it has stopped (YES in step S115), the main CPU 41 increments the count value S of the counter of the number of combination stop times of the RAM 43 by "one" (step S116).

Then, irrespective of whether or not a combination including a predetermined number (six) of symbols "PLUM" has stopped, the main CPU 41 determines whether or not the count value N of the counter of the number of execution times has reached 10, that is, whether or not the special game has been executed 10 times (step S118), after incrementing the count value N of the counter of the number of execution times of the RAM 43, indicating the number of execution times of the special game, by "one" (step S117).

When the count value N of the counter of the number of execution times has not reached 10 (NO in step S118), the main CPU 41 repeats the processing in step S112 and in the subsequent steps and when it has reached 10 (YES in step S118), the main CPU 41 executes the payout processing on the assumption that the number of execution times of the special game has reached 10 (step S119).

In this payout processing, the main CPU 41 selects a payout table corresponding to the count value S of the counter of the number of combination stop times of the RAM 43 from among the payout tables for the special game in FIG. 4N to FIG. 4W and executes the payout processing for the combination of the symbols "PLUM" having stopped on each of the display areas 28 by applying the payout rate defined in the selected payout table for the special game (step S29).

By the way, the "combination of the player-selected symbols "PLUM" referred to here may include a winning combination of the player-selected symbols "PLUM", as shown in FIG. 18B for example, having stopped on the payline L on the display areas 28, however, in the present embodiment, the explanation is given on the assumption that the combination is one, as shown in FIG. 18A for example, which includes a predetermined number (six, in FIG. 18A) of player-selected symbols "PLUM".

In addition, the payout table for the special game corresponding to the count value S of the counter of the number of combination stop times of the RAM 43 can be set as follows, for example.

In other words, it is possible to set so that the payout table for the special game in FIG. 4M is applied when the count value S is zero, the payout table for the special game in FIG. 4N is applied when the count value S is one, the payout table for the special game in FIG. 40 is applied when the count value S is two, the payout table for the special game in FIG. 4P is applied when the count value S is three, and the payout table for the special game in FIG. 4Q is applied when the count value S is four.

Further, it is possible to set so that the payout table for the special game in FIG. 4R is applied when the count value S is five, the payout table for the special game in FIG. 4S is applied when the count value S is six, the payout table for the special game in FIG. 4T is applied when the count value S is seven, the payout table for the special game in FIG. 4U is applied when the count value S is eight, the payout table for the special game in FIG. 4V is applied when the count value S is nine, and the payout table for the special game in FIG. 4W is applied when the count value S is ten.

Consequently, it follows that the main CPU 41 makes the payout of two coins as the special game minimum guarantee when a combination including a predetermined number (six) of symbols "PLUM" has never stopped on each of the display areas 28 during the special game (S=0).

In addition, when a combination including a predetermined number (six) of symbols "PLUM" has stopped at least once on each of the display areas 28 during the special game, it follows that the main CPU 41 makes payout by increasing the number of coins to be paid out as 3, 6, 12, 24, 48, 96, 192, 384, 768, and 1,536 in accordance with the number of stop times (the count value S of the counter of the number of combination stop times).

It is possible to regard the payout processing by the main CPU 41 of the slot machine 10 in this second embodiment as one that varies the payout amount for the (establishment of the start condition of) special game in accordance with the number of times of rearrangement of a combination including a predetermined number (six) of player-selected symbols "PLUM" at the start of the special game during the period of 10 special games.

Alternatively, it is also possible to regard the payout processing by the main CPU 41 of the slot machine 10 in the second embodiment as one that varies the payout amount for the rearrangement of a combination including a predetermined number (six) of symbols "PLUM", which is a specific player-selected symbol "PLUM", having occurred during the special game, in accordance with the total number of times of the rearrangement of the combination including a predetermined number (six) of player-selected symbols "PLUM" having occurred until the 10 special games are terminated.

Then, the main CPU 41 resets to zero the count value S of the counter of the number of combination stop times of the RAM 43 and the count value N of the counter of the number of execution times and as shown in FIG. 20C, turns all the parts of the backlight 14L to bring each of the symbol display areas 14*a* to 14*j* of the symbol selecting display 14 into the unlit (inactive) state (step S120), terminates the special game, and shifts to the execution processing of the base game alone.

In this manner, the base game and the special game as the second game are executed.

According to the slot machine according to the second embodiment, when the special game is started, it is possible to further develop the player's interest in the game by causing the player to expect that the payout of a large amount of credits can be made when the special game is terminated depending on the number of times of the occurrence of award accompanied by the payout of credits due to the specific player-selected symbol.

The embodiments of the slot machine according to the present invention are described as above, however, they are illustrated as a concrete example, and therefore, the present invention is not limited in particular, and the concrete configuration of each unit etc. can be modified adequately in design. In addition, the effects described in the embodiments of the present invention are just enumerated as optimum effects that are derived from the present invention, and the effects due to the present invention are not limited by those described in the embodiments of the present invention.

For example, the controller 48 of the present invention can be constituted by a CPU that executes processing according to programs as the main CPU 41 of the mother board 40 and the CPU 51 of the gaming board 50 of the slot machines 10 in the first embodiment and the second embodiment, however, it is also possible to configure a part of the controller 48 by using a custom IC (Integrated Circuit), such as an ASIC (Application Specific Integrated Circuit), or a DSP (Digital Signal Processor).

In addition, in the first embodiment, its modification example, and the second embodiment, explanation is given on the assumption that the specific player-selected symbol at the start of the special game is the "PLUM", however, it is also possible for the player to select the "BELL", "CHERRY", "STRAWBERRY", "ORANGE", "APPLE", "LOBSTER", and "CRAB" other than the symbol "PLUM" as a specific symbol at the start of the special game In this case, when the main CPU 41 determines that a predetermined number (for example, six) of symbols selected by the player from among the "BELL", "CHERRY", "STRAWBERRY", "ORANGE", "APPLE", "LOBSTER", and "CRAB" other than the symbol "PLUM" at the start of the special game have stopped on the display areas 28 (28*a* to 28*e*), the payout processing is executed by the main CPU 41.

Further, in the first embodiment and its modification example, a case where the special game is executed simultaneously with the base game is explained, however, a configuration is also possible, in which when the start condition of the special game has been established, the base game is aborted and the special game is executed.

In such a configuration, the contents of the processing executed by the main CPU 41 are changed to those in which the processing in step S28 in the flow chart in FIG. 11 and FIG. 15 is omitted, or to those in which step S24 in FIG. 10 is changed to the determination as to whether or not a combination of the player-selected symbols "PLUM" through the contact operation of the touch screen 69, for which payout will be made, has stopped on each of the display areas 28, as in step S27 in FIG. 11 and FIG. 15, and when the combination has stopped, there is a shift to step S29 in FIG. 11 and FIG. 15, and when it has not stopped, there is a shift to step S25 in FIG. 10.

What is claimed is:

1. A slot machine comprising:

a display on which a plurality of symbols that have been arranged are rearranged in a unit game; and a controller operable to:

(a) execute a predetermined number of times of the unit game as a special game after a subgame when the subgame, in which a specific symbol is selected from among a plurality of kinds of symbols by an external input, has been executed; and (b) (i) vary payout amount of credits for occurrence of an award accompanied by payout of credits due to the specific symbol during the predetermined number of times of the special game in accordance with the number of specific symbols rearranged on the display during the predetermined number of times of the special game, or (ii) vary payout amount of credits when the predetermined number of times of the special game terminate in accordance with the number of times of occurrence of an award accompanied by payout of credits due to the specific symbol during the predetermined number of times of the special game.

2. The slot machine according to claim 1, wherein the controller is operable to:

(i) increase the payout amount of credits for the occurrence of the award accompanied by the payout of credits due to the specific symbol during the predetermined number of times of the special game as the number of specific symbols rearranged on the display during the predetermined number of times of the special game increases, or (ii) increase the payout amount of credits when the predetermined number of times of the special game terminate as the number of times of the occurrence of the award accompanied by the payout of credits due to the specific symbol during the predetermined number of times of the special game increases.

3. The slot machine according to claim 1, wherein the controller is operable to:

(i) vary the payout amount of credits for the occurrence of the award accompanied by the payout of credits due to the specific symbol during the predetermined number of times of the special game in accordance with the number of specific symbols rearranged on the display during the predetermined number of times of the special game, and (ii) terminate the special game when the award accompanied by the payout of credits due to the specific symbol occurs.

4. The slot machine according to claim 1, wherein the controller is operable to:

(i) vary the payout amount of credits when the predetermined number of times of the special game terminate in accordance with the number of times of the occurrence of the award accompanied by payout of credits due to the specific symbol during the predetermined number of times of the special game, and (ii) set the payout amount of credits when the predetermined number of times of the special game terminate to a predetermined minimum amount when the number of times of the occurrence of the award accompanied by payout of credits due to the specific symbol during the predetermined number of times of the special game is zero.

5. A slot machine comprising:

a display on which a plurality of symbols that have been arranged are rearranged in a unit game; and a controller operable to:

(a) execute a predetermined number of times of the unit game as a special game after a subgame when the subgame in which a specific symbol is selected from among a plurality of kinds of symbols by an external input has been executed; and (b) (i) increase payout amount of credits for occurrence of an award accompanied by payout of credits due to the specific symbol during the predetermined number of times of the special game as the number of specific symbols rearranged on the display during the predetermined number of times of the special game increases, or (ii) increase payout amount of credits when the predetermined number of times of the special game terminate as the number of times of occurrence of an award accompanied by payout of credits due to the specific symbol during the predetermined number of times of the special game increases.

6. The slot machine according to claim 5, wherein the controller is operable to:

(i) increase the payout amount of credits for the occurrence of the award accompanied by the payout of credits due to the specific symbol during the predetermined number of times of the special game in accordance with the increase in the number of specific symbols rearranged on the display during the predetermined number of times of the special game, and (ii) terminate the special game when the award accompanied by the payout of credits due to the specific symbol occurs.

7. The slot machine according to claim 6, wherein the controller is operable to:

(i) increase the payout amount of credits when the predetermined number of times of the special game terminate in accordance with the increase in the number of times of the occurrence of the award accompanied by payout of credits due to the specific symbol during the predetermined number of times of the special game, and (ii) set the payout amount of credits when the predetermined number of times of the special game terminate to a predetermined minimum amount when the number of times of the occurrence of the award accompanied by the payout of credits due to the specific symbol during the predetermined number of times of the special game is zero.

8. A slot machine comprising:

a display on which a plurality of symbols that have been arranged are rearranged in a unit game; and a controller operable to:

(a) execute a predetermined number of times of the unit game as a special game after a subgame when the subgame in which a specific symbol is selected from among a plurality of kinds of symbols by an external input has been executed; and (b) (i) increase payout amount of credits for occurrence of an award accompanied by payout of credits due to the specific symbol during the predetermined number of times of the special game as the number of specific symbols rearranged on the display during the predetermined number of times of the special game increases, and (ii) terminate the special game when the award accompanied by the payout of credits due to the specific symbol occurs.

9. A slot machine comprising:

a display on which a plurality of symbols that have been arranged are rearranged in a unit game; and a controller operable to:

(a) execute a predetermined number of times of the unit game as a special game after a subgame when the subgame in which a specific symbol is selected from among a plurality of kinds of symbols by an external input has been executed; and (b) (i) increase payout amount of credits when the predetermined number of times of the special game terminate as the number of times of occurrence of an award accompanied by payout of credits due to the specific symbol during the predetermined number of times of the special game increases, and (ii) set payout amount of credits when the predetermined number of times of the special game terminate to a predetermined minimum amount when the number of times of occurrence of an award accompanied by payout of credits due to the specific symbol during the predetermined number of times of the special game is zero.

10. A slot machine playing method, the slot machine including a controller and a display on which a plurality of symbols are rearranged in a unit game, the playing method comprising:

(a) with the controller, executing a predetermined number of times of a unit game as a special game after a subgame when the subgame in which a specific symbol is selected from among the plurality of symbols by an external input has been executed; and (b) with the controller, (i) varying payout amount of credits for occurrence of an award accompanied by payout of credits due to the specific symbol during the predetermined number of times of the special game in accordance with the number of the specific symbols rearranged on the display during the predetermined number of times of the special game, or (ii) varying payout amount of credits when the predetermined number of times of the special game terminate in accordance with the number of times of occurrence of an award accompanied by payout of credits due to the specific symbol during the predetermined number of times of the special game.

11. The slot machine playing method according to claim 10, further comprising:

(i) increasing the payout amount of credits for the occurrence of the award accompanied by the payout of credits due to the specific symbol during the predetermined number of times of the special game as the number of specific symbols rearranged on the display during the predetermined number of times of the special game increases, or (ii) increasing the payout amount of credits when the predetermined number of times of the special game terminate as the number of times of the occurrence of the award accompanied by the payout of credits due to the specific symbol during the predetermined number of times of the special game increases.

12. The slot machine playing method according to claim 10, further comprising:

(i) varying the payout amount of credits for the occurrence of the award accompanied by the payout of credits due to the specific symbol during the predetermined number of times of the special game in accordance with the number of specific symbols rearranged on the display during the predetermined number of times of the special game, and (ii) terminating the special game when the award accompanied by the payout of credits due to the specific symbol occurs.

13. The slot machine playing method according to claim 10, further comprising:

(i) varying the payout amount of credits when the predetermined number of times of the special game terminate in accordance with the number of times of the occurrence of the award accompanied by the payout of credits due to the specific symbol during the predetermined number of times of the special game, and (ii) setting the payout amount of credits when the predetermined number of times of the special game terminate to a predetermined minimum amount when the number of times of the occurrence of the award accompanied by the payout of credits due to the specific symbol during the predetermined number of times of the special game is zero.

14. A slot machine playing method, the slot machine including a controller and a display on which a plurality of symbols are rearranged in a unit game, the playing method comprising:

(a) with the controller, executing a predetermined number of times of a unit game as a special game after a subgame when the subgame in which a specific symbol is selected from among the plurality of symbols by an external input has been executed; and (b) with the controller, (i) increasing payout amount of credits for occurrence of an award accompanied by payout of credits due to the specific symbol during the predetermined number of times of the special game as the number of specific symbols rearranged on a display during the predetermined number of times of the special game increases, or (ii) increasing payout amount of credits when the predetermined number of times of the special game terminate as the number of times of occurrence of an award accompanied by payout of credits due to the specific symbol during the predetermined number of times of the special game increases.

15. The slot machine playing method according to claim 14, further comprising:

(i) increasing the payout amount of credits for the occurrence of the award accompanied by the payout of credits due to the specific symbol during the predetermined number of times of the special game in accordance with the increase in the number of specific symbols rearranged on the display during the predetermined number of times of the special game, and (ii) terminating the special game when the award accompanied by the payout of credits due to the specific symbol occurs.

16. The slot machine playing method according to claim 14, further comprising:

(i) increasing the payout amount of credits when the predetermined number of times of the special game terminate in accordance with the increase in the number of times of the occurrence of the award accompanied by the payout of credits due to the specific symbol during the predetermined number of times of the special game, and (ii) setting the payout amount of credits when the predetermined number of times of the special game terminate to a predetermined minimum amount when the number of times of the occurrence of the award accompanied by the payout of credits due to the specific symbol during the predetermined number of times of the special game is zero.

17. A slot machine playing method, the slot machine a including a controller and a display on which a plurality of symbols that are rearranged in a unit game, the playing method comprising:

(a) with the controller, executing a predetermined number of times of a unit game as a special game after the subgame when the subgame in which a specific symbol is selected from among a plurality of kinds of symbols by an external input has been executed; and (b) with the controller, (i) increasing payout amount of credits for occurrence of an award accompanied by payout of credits due to the specific symbol during the predetermined number of times of the special game as the number of specific symbols rearranged on a display during the predetermined number of times of the special game increases, and (ii) terminating the special game when the award accompanied by payout of credits due to the specific symbol occurs.

18. A slot machine playing method, the slot machine including a controller and a display on which a plurality of symbols are rearranged in a unit game, the playing method comprising:

(a) with the controller, executing a predetermined number of times of a unit game as a special game after a subgame when the subgame in which a specific symbol is selected from among a plurality of kinds of symbols by an external input has been executed; and (b) with the controller, (i) increasing payout amount of credits when the predetermined number of times of the special game terminate as the number of times of occurrence of an award accompanied by payout of credits due to the specific symbol during the predetermined number of times of the special game increases; and (ii) setting payout amount of credits when the predetermined number of times of the special game terminate to a predetermined minimum amount when the number of times of occurrence of an award accompanied by payout of credits due to the specific symbol during the predetermined number of times of the special game is zero.

* * * * *